(12) United States Patent
Frank et al.

(10) Patent No.: US 9,062,571 B2
(45) Date of Patent: Jun. 23, 2015

(54) COMPRESSED AIR SUPPLY DEVICE AND METHOD

(75) Inventors: Dieter Frank, Hannover (DE); Jorg Meier, Hessisch Oldendorf (DE); Frank Meissner, Hannover (DE)

(73) Assignee: WABCO GmbH, Hannover (DE)

( * ) Notice: Subject to any disclaimer, the term of this patent is extended or adjusted under 35 U.S.C. 154(b) by 109 days.

(21) Appl. No.: 13/994,475

(22) PCT Filed: Nov. 22, 2011

(86) PCT No.: PCT/EP2011/005865
§ 371 (c)(1),
(2), (4) Date: Jun. 14, 2013

(87) PCT Pub. No.: WO2012/079690
PCT Pub. Date: Jun. 21, 2012

(65) Prior Publication Data
US 2013/0255609 A1    Oct. 3, 2013

(30) Foreign Application Priority Data

Dec. 16, 2010  (DE) .......................... 10 2010 054 699

(51) Int. Cl.
| | |
|---|---|
| *B60G 11/26* | (2006.01) |
| *F01L 1/34* | (2006.01) |
| *B60G 17/015* | (2006.01) |
| *B60G 17/052* | (2006.01) |

(52) U.S. Cl.
CPC ............... *F01L 1/34* (2013.01); *B60G 17/0155* (2013.01); *B60G 17/0523* (2013.01); *B60G 2300/07* (2013.01); *B60G 2500/2021* (2013.01); *B60G 2500/2042* (2013.01); *B60G 2500/2044* (2013.01); *B60G 2500/30* (2013.01); *B60G 2600/26* (2013.01)

(58) Field of Classification Search
USPC ..................... 280/5.5, 6.15, 124.157, 124.16, 280/124.161
See application file for complete search history.

(56) References Cited

U.S. PATENT DOCUMENTS

| | | | |
|---|---|---|---|
| 4,756,548 | A | 7/1988 | Kaltenthaler et al. |
| 5,466,007 | A | 11/1995 | Smith |
| 5,711,150 | A | 1/1998 | Oshita et al. |

(Continued)

FOREIGN PATENT DOCUMENTS

| | | |
|---|---|---|
| DE | 2 016 030 | 2/1972 |
| DE | 35 42 974 A1 | 6/1987 |

(Continued)

*Primary Examiner* — Toan To
(74) *Attorney, Agent, or Firm* — Kramer Levin Naftalis & Frankel LLP

(57) ABSTRACT

A compressed air supply device for operating a pneumatic system, such as a vehicle pneumatic suspension system, comprises a compressed air supply, a first pneumatic connection between the compressed air supply and the pneumatic system, the first pneumatic connection having an air desiccator, a throttle device, and at least one controllable isolating valve, and a second pneumatic connection pneumatically connected to the first pneumatic connection and to a vent connection leading to the surroundings, the second pneumatic connection having at least one controllable vent valve. According to one embodiment, the controllable isolating valve and the throttle device are arranged in series in the first pneumatic connection such that the controllable isolating valve can be switched into an open state when in a through-flow mode, and into a closed state when in an isolating mode.

21 Claims, 15 Drawing Sheets

(56) References Cited

U.S. PATENT DOCUMENTS

| | | | |
|---|---|---|---|
| 6,074,177 | A | 6/2000 | Kobayashi et al. |
| 6,098,967 | A | 8/2000 | Folchert |
| 6,231,321 | B1 | 5/2001 | Fukudome et al. |
| 6,752,402 | B2 | 6/2004 | Grotendorst et al. |
| 6,817,600 | B2 | 11/2004 | Ocker et al. |
| 6,824,145 | B2 | 11/2004 | Behmenburg |
| 7,032,895 | B2 | 4/2006 | Folchert |
| 7,255,358 | B2 * | 8/2007 | Kim ................ 280/124.16 |
| 7,484,747 | B2 * | 2/2009 | Geiger ............. 280/124.157 |
| 8,777,246 | B2 * | 7/2014 | Meier ............... 280/124.16 |
| 8,814,190 | B2 * | 8/2014 | Becher et al. ....... 280/124.16 |
| 2002/0079626 | A1 * | 6/2002 | Grotendorst et al. .... 267/64.19 |
| 2002/0136645 | A1 | 9/2002 | Folchert et al. |
| 2006/0049606 | A1 * | 3/2006 | Geiger et al. ....... 280/124.157 |
| 2010/0074764 | A1 | 3/2010 | Schnittger et al. |
| 2013/0276899 | A1 * | 10/2013 | Frank et al. ............. 137/1 |
| 2013/0318954 | A1 * | 12/2013 | Frank et al. ............ 60/407 |
| 2013/0320645 | A1 * | 12/2013 | Gall ................. 280/124.16 |

FOREIGN PATENT DOCUMENTS

| | | |
|---|---|---|
| DE | 39 19 438 | 12/1990 |
| DE | 692 08 887 T2 | 4/1996 |
| DE | 197 31 402 | 1/1999 |
| DE | 199 11 933 B4 | 9/1999 |
| DE | 199 35 810 A1 | 3/2000 |
| DE | 100 16 970 C1 | 7/2001 |
| DE | 100 38 266 A1 | 2/2002 |
| DE | 101 21 582 C2 | 11/2002 |
| DE | 102 31 251 C1 | 8/2003 |
| DE | 102 23 405 A1 | 12/2003 |
| DE | 10 2004 035 763 | 3/2006 |
| DE | 10 2006 041 010 | 3/2008 |
| DE | 10 2007 013 673 A1 | 9/2008 |
| DE | 10 2007 032 963 | 1/2009 |
| EP | 1 216 860 | 6/2002 |
| EP | 1 243 447 A2 | 9/2002 |
| EP | 1 380 453 B1 | 1/2004 |
| JP | 1 141112 | 6/1989 |

* cited by examiner

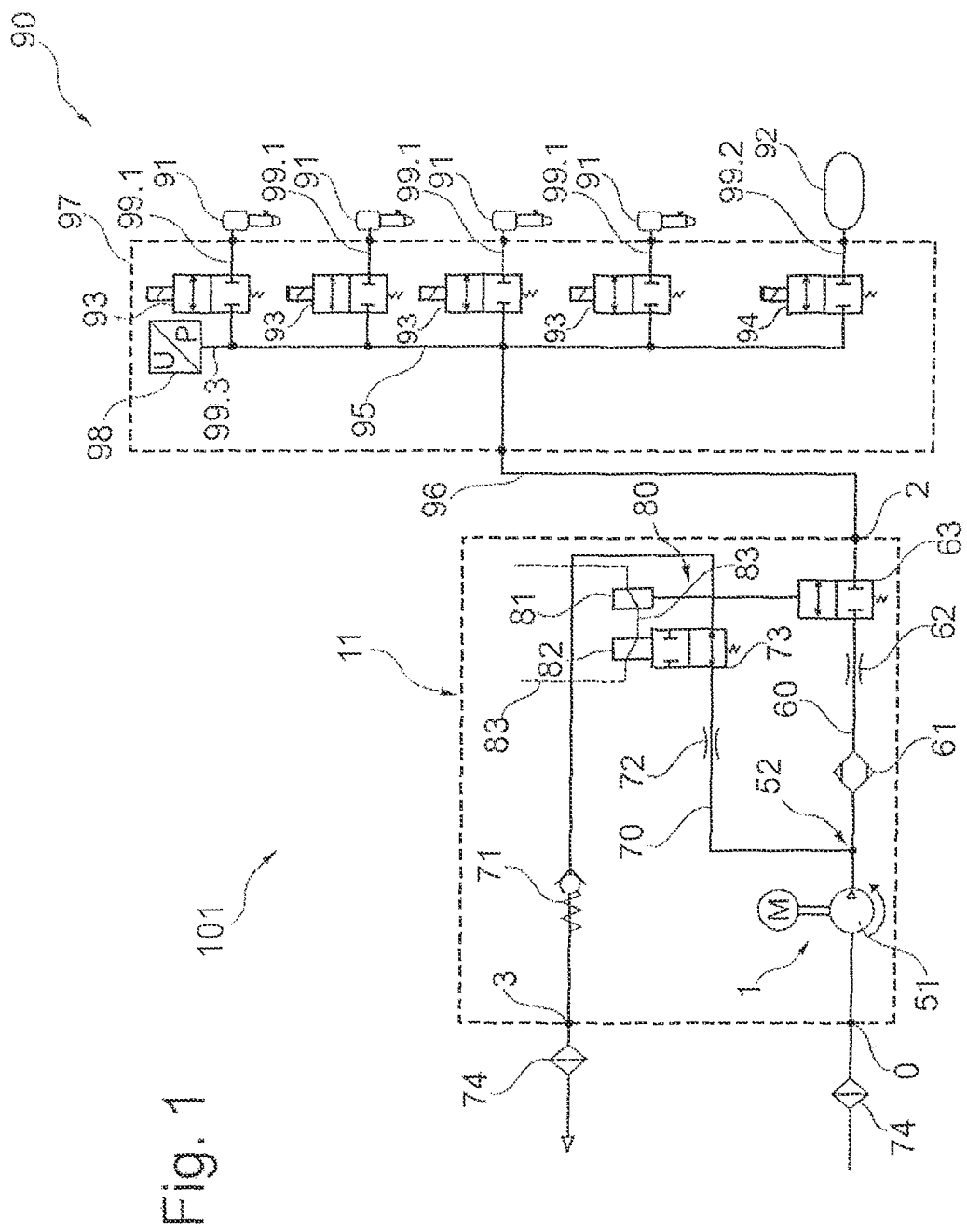

COMPRESSED AIR SUPPLY DEVICE AND METHOD

FIELD OF THE INVENTION

The present invention generally relates to a compressed air supply device and method for a pneumatic system having a pneumatic installation, such as an air spring installation.

BACKGROUND OF THE INVENTION

A compressed air supply device is used in vehicles of all kinds, in particular, for supplying a vehicle air spring installation with compressed air. Air spring installations can comprise leveling devices for adjusting the distance between the vehicle axle and the vehicle body. An air spring installation can comprise a number of pneumatic bellows connected pneumatically to a common line (i.e., gallery), which can raise the vehicle body as they are filled to an increasing extent, and can correspondingly lower the vehicle body as the filling decreases. As the distance between the vehicle axle and the vehicle body or ground clearance increases, spring travels become longer, making it possible to cope with even relatively large irregularities in the ground without making contact the vehicle body. Such systems are increasingly being used in all-terrain vehicles and sport utility vehicles (SUV). Particularly with SUVs having powerful engines, it is desirable to provide the vehicle, on the one hand, with a relatively small ground clearance for high speeds on the road and, on the other hand, with a relatively large ground clearance for off-road use. It is furthermore desirable to implement a change in the ground clearance as quickly as possible, which increases the demand for rapidity, flexibility, and reliability of a compressed air supply installation.

In order to ensure long-term operation of the compressed air supply device, a main pneumatic line has an air drier for drying the compressed air. This avoids accumulation of moisture in the pneumatic system. At relatively low temperatures, moisture can lead to the formation of crystals that damage valves, and can also lead to unwanted faults in the compressed air supply device and in the pneumatic installation. An air drier has a desiccant, generally in the form of a granular fill, through which the compressed air can flow, allowing the granular fill to take up moisture contained in the compressed air by adsorption. If appropriate, an air drier can be designed as a regenerative air drier. This can be accomplished by arranging for the dried compressed air from the pneumatic installation, in particular an air spring installation, to flow through the granular fill in a countercurrent or co-current pattern relative to the filling direction during each venting cycle. Regeneration of the air drier is made possible essentially by a pressure swing at the air drier, with a pressure prevailing during regeneration generally being lower in comparison with adsorption in order to enable moisture to be released from the granules. For this purpose, the vent valve arrangement can be opened, with the regeneration capacity of the air drier generally being dependent on the pressure conditions and the pressure swing in the compressed air supply device. For a "pressure swing adsorption process" of this kind, too, it is desirable to make a compressed air supply device flexible and reliable. In particular, the aim is to allow relatively quick venting, while making available an air pressure sufficiently low for regeneration of the air drier.

DE 35 42 974 A1 describes a leveling device for vehicles that is provided with air filters and by means of which a predetermined distance between the vehicle cell and the vehicle axle can be adjusted in accordance with the vehicle loading, by filling or emptying the air springs. The device has a safety valve that can be controlled by means of the pressure in the air springs. In an installation of this kind, the air drier can be regenerated via a restrictor and a nonreturn valve that opens counter to a filling direction.

DE 199 11 933 B4 describes a compressed air supply device having an air drier with a first compressed air supply line, wherein the compressed air is passed through a desiccant in the air drier, and with a second compressed air supply line, through which compressed air can flow without having to pass through the desiccant.

Many different approaches to the design of a first pneumatic connection between a compressed air feed and a pneumatic installation are known. These allow for the basic functions of a compressed air supply device when supplying air to the pneumatic installation and releasing air from the pneumatic installation. With respect to the abovementioned requirement for relatively quick venting with an air pressure that is nevertheless sufficiently low for regeneration of the air drier, however, these approaches are still in need of improvement.

DE 102 23 405 B4 describes an air spring system on a motor vehicle with a compressed air supply device having a delivery line for connecting a compressor to the air springs and a vent line, via which the delivery line can be connected to atmosphere while being capable of being shut off by means of a switching valve. A segment of the delivery line, in which a restrictor is arranged in parallel with a nonreturn valve and a further switching valve, the segment being designed as a pneumatic parallel circuit, is provided between a drier and level control valves in a gallery of the air spring installation. The switching valve in the vent line and the switching valve in the segment of the delivery line are connected to the same output stage of a control unit by electric control lines.

DE 101 21 582 C2 describes an air supply unit for an air suspension installation, in which a vent valve in a vent line, an air spring valve in the gallery of the air suspension installation, and an air control valve are provided. All three valves are connected to an electronic control unit. The air control valve is connected in parallel with a nonreturn valve in a segment of a delivery line between a drier and a spring valve, the segment being designed as a pneumatic parallel circuit, with the result that, although air can be taken into the air spring installation unhindered, it can only be released again in a controlled manner via the air control valve. To release compressed air from the air suspension installation, all three of the valves mentioned above are opened.

U.S. Pat. No. 6,098,967 describes a compressed air supply device of the type stated at the outset, in which a segment designed as a pneumatic parallel circuit and containing two branch lines connected in parallel is arranged in the main pneumatic line between the air drier and the air spring installation, wherein, in a first branch line, a nonreturn valve, through which there can be a flow for flow admission, and, in a second branch line, a nonreturn valve, through which there can be a flow for venting, are connected in series with a restrictor and a switching valve.

EP 1 216 860 B1 describes a leveling installation for a motor vehicle, having air springs and having a control unit which exercises open-loop or closed-loop control over the functions of filling and emptying in accordance with the level of the vehicle body. Among the elements connected to the control unit are a controllable directional control valve of a compressed air supply device and a controllable directional control valve arranged ahead of a reservoir. The controllable directional control valve of the compressed air supply device, which is subject only to fixed restriction in the open state, is arranged in parallel with a nonreturn valve.

The need for further improvement in the connection of an air spring installation to the compressed air supply device, the relatively complex nature of the connection and the large number of components involved in it are problematic in all of the compressed air supply devices described above. Owing to the fact that the abovementioned segment is generally designed as a parallel circuit in a main pneumatic line, the line is open, at least in a bypass line, or has to be opened against a counterpressure, e.g., that of a nonreturn valve.

FIG. 9 of EP 1 243 447 A2 illustrates a closed leveling installation having a gallery line, to which a number of bellows, each serving as a pressure chamber for an air spring, and a controllable isolating valve arrangement of a pneumatic installation are connected, the arrangement being formed by a first 2/2-way valve and a second 2/2-way valve arranged in series. The second directional control valve is arranged in the compressed air line between the first controllable directional control valve and the air springs. The gallery line is connected to the second directional control valve. The pneumatic installation can be filled and emptied from the compressed air supply device, which is connected to the first directional control valve, via the isolating valve arrangement on one side of a drier. A compressed air reservoir is connected to the compressed air supply device via a separate directional control valve and a separate pneumatic line on the other side of the drier.

EP 1 380 453 B1 discloses a similarly closed leveling installation for vehicles, by means of which a vehicle body is sprung relative to at least one vehicle axle. The pneumatic installation can be filled and emptied from the compressed air supply device on one side of a drier, the device being connected to a single 2/2-way valve. In this device, a compressed air reservoir is likewise connected to the compressed air supply device via a separate directional control valve and a separate pneumatic line on the other side of the drier. The compressed air reservoir is isolated from the compressed air supply device independently of an air spring installation, by means of a 4/4-way valve or two 2/2-way valves.

These pneumatic systems, in which the connection of the pneumatic installation to the necessarily closed compressed air supply device is relatively complex, can also be further improved.

SUMMARY OF THE INVENTION

Generally speaking, it is an object of the present invention to provide a compressed air supply device that operates reliably, flexibly, and quickly. In particular, it is an object to provide a compressed air supply device that is of relatively simple construction and yet, allows relatively quick venting combined with drier regeneration. It is a further object to provide a compressed air supply device having improved acoustics.

According to one embodiment, a compressed air supply device is operated with compressed air (e.g., within a pressure level range from 5 to 20 bar) in a pneumatic system having a pneumatic installation, such as an air spring installation described above, wherein the compressed air of the compressed air supply device is made available from a compressed air feed. The compressed air for the compressed air feed can be produced, in particular, by an air compressor arranged between an air feed and a compressed air port. To supply the pneumatic installation, the compressed air feed is connected to the compressed air port leading to the pneumatic installation by a first pneumatic connection. The first pneumatic connection of the compressed air supply device advantageously has a main pneumatic line. Moreover the compressed air supply device has a second pneumatic connection (advantageously a vent line) having a controllable vent valve, and which is connected pneumatically to the main pneumatic line and to a vent port leading to the environment. The compressed air feed is thereby connected pneumatically, inter alia, via the controllable vent valve, to a vent port leading to the environment. By means of the controllable vent valve, the compressed air supply device can be vented by discharging air toward the vent port in order to vent the pneumatic installation.

Improved design of the pneumatic connection between the compressed air feed and a compressed air port leading to the pneumatic installation can be a basis for improved drier regeneration as well as for flexible and quick venting of the compressed air supply device and/or of the pneumatic installation and for the admission of air thereto. A main pneumatic line for the formation of the pneumatic connection can be of relatively simple design for this purpose, and can be designed such that the pneumatic connection can be closed bidirectionally and completely. For this purpose, a controllable isolating valve and a restricting can be provided in series in the main pneumatic line.

It is advantageous if the isolating valve and/or the vent valve are directional control valves. In an isolating mode, the controllable isolating valve, in particular, in the form of a directional control valve, can be switched to a closed state, with the pneumatic connection being bidirectionally and completely cut off (i.e. closed) in the closed state. In other words, a pneumatic connection between the compressed air feed and the compressed air port leading to the pneumatic system can be closed in an airtight manner or is closed in an airtight manner when the controllable isolating valve is in the closed state. This leads to an advantageous decoupling of the compressed air supply device and the pneumatic installation. It is advantageous if the main pneumatic line (e.g., together with a further pneumatic line in series) is the only line of the pneumatic connection, at least between an air drier of the compressed air supply device and a gallery line of a pneumatic installation.

In the case of a pneumatic connection that can be cut off bidirectionally and completely, it is advantageously possible to implement a very wide range of operating states in the pneumatic installation, in particular an air spring installation, without thereby affecting the compressed air supply device. In particular, a possibly ineffective action on the air drier is thereby avoided. For this purpose, it is advantageous if the main pneumatic line is provided as a single line so as to form the pneumatic connection between the compressed air feed and the compressed air port. Thus, in the case of a pneumatic connection that is completely and bidirectionally closed, a pressure measurement can advantageously be performed in the reservoir or the bellows in an air spring installation connected to the compressed air port. In particular, it has also been found that a pressure measurement, that would otherwise take a relatively long time (either due to relatively complex circuits or ineffective action on the drier) can be performed relatively quickly. It is also possible to cross-connect the reservoir and/or the bellows via the gallery of the air spring installation without impairing the compressed air supply device, in particular an air drier.

Conversely, embodiments of the present invention offer the possibility of adjusting the controllable isolating valve such that, in an open state (e.g., in a through-flow mode) the series arrangement, consisting of the controllable isolating valve in the open state and the restricting means, forms an arrangement that is optimized for the filling of the pneumatic installation and the venting of the pneumatic installation. Moreover, drier regeneration and the requirements for a compressed air supply device that can be actuated flexibly and quickly are also accomplished.

According to one embodiment of the invention, this can be implemented in a particularly effective manner if the controllable isolating valve and the controllable vent valve are set up to be controlled by means of a control signal common to both. In particular, both valves are connected to an electronic controller by means of a control line common to both. Thus, control signals can be transmitted from an electronic controller, in particular a common electronic controller, in the common control line.

In particular, it has proven to be advantageous if the controllable isolating valve is formed with a first coil and the controllable vent valve is formed with a second coil, wherein the first coil and the second coil are formed with a single coil former common to both coils. The coil can preferably be formed with a first coil armature that is arranged in the coil former and that has a first valve body, and with a second coil armature that is arranged in the coil former and that has a second valve body. A directional control valve, which is also referred to as a double armature solenoid valve, can thus embody both the isolating valve and the vent valve in a very compact design.

If required, it is also possible, in principle, for the controllable isolating valve to be formed with a first coil and for the controllable vent valve to be formed with a second coil, wherein the first and the second coil have separate coil formers. It is also possible for the controllable isolating valve and the controllable vent valve to be controllable by means of a common control signal.

In principle, the at least one controllable isolating valve can be arranged at any point in the first pneumatic connection between the compressed air feed and the pneumatic installation.

In accordance with a preferred embodiment, the main pneumatic line of the pneumatic connection runs between the compressed air feed and a compressed air port leading to the pneumatic installation. This has the advantageous effect that the at least one isolating valve can be arranged within a compressed air supply device that can be configured as a unit. It is advantageous that, in a closed state of the controllable isolating valve, the main pneumatic line between the air drier and the compressed air port is bidirectionally and completely closed.

In accordance with another preferred embodiment, the main pneumatic line runs between the compressed air feed and a gallery port and/or a reservoir port in the pneumatic installation. This has the advantageous effect that the at least one controllable isolating valve can also be provided in a pneumatic installation, i.e., outside a compressed air supply device that can be configured as a unit. It is advantageous that, in a closed state of the controllable isolating valve, the main pneumatic line between the air drier and the gallery port and/or a reservoir port in the pneumatic installation is bidirectionally and completely closed.

In particular, it has proven advantageous to provide a first controllable isolating valve and a second controllable isolating valve. Embodiments of the present invention are thus not restricted to a single controllable isolating valve. On the contrary, it has proven advantageous, in the context of the preferred embodiment described above where the main pneumatic line runs between the compressed air feed and a gallery port and/or a reservoir port in the pneumatic installation, for the first controllable isolating valve to be formed with a first coil and the second controllable isolating valve to be formed with a second coil. For example, in one embodiment, the first and second coils can be formed with a single coil former common to both coils. In this case, the first controllable isolating valve and the second controllable isolating valve can be implemented as part of a "double solenoid valve arrangement", wherein at least one, preferably the first and the second, controllable isolating valve of the double solenoid valve arrangement is/are controllable.

Various embodiments of a compressed air supply device described in greater detail below can be implemented for the controllable isolating valve, which is arranged within a compressed air supply device that can be configured as a unit. The various embodiments can also be implemented in relation to at least one controllable isolating valve arranged separately from a unit of the compressed air supply device, e.g., a controllable isolating valve in the pneumatic installation, in particular in a valve block thereof.

According to one embodiment of the present invention, at least the controllable isolating valve can be switched over between a first control state and a second control state. In this case, the first control state is assigned to a closed state of the controllable isolating valve, and the second control state is assigned to an open state of the controllable isolating valve. The first and/or second control state can advantageously be specified at least to the controllable isolating valve by means of an electronic controller, being specified to the controllable isolating valve, for example, by means of a suitable control signal passed via a control line. The first control state can be made such that the isolating valve moves completely to the closed state. The first control state can also be configured such that the isolating valve begins to move to the closed state at the beginning of the switching operation without reaching the closed state. It is likewise possible for the second control state to move the controllable isolating valve into the completely open state. The second control state can also be made such that the controllable isolating valve opens partially at the beginning of the switching operation and then continues to move toward the completely open state without reaching the completely open state. For example, the first and the second control state can be made such that the controllable isolating valve moves backward and forward dynamically between a completely closed state and a completely open state without the controllable isolating valve being completely closed or completely open.

Owing to the series arrangement of the isolating valve and the restricting means, the main pneumatic line is designed to be actuated in a relatively simple, flexible, and reliable manner. In one preferred embodiment, a through-flow quantity, at least for the controllable isolating valve (and if appropriate, also for the controllable vent valve), can be subjected to closed-loop and/or open-loop control in the through-flow mode. In the context of this embodiment, the controllable isolating valve can be controlled such that a setting that is advantageous for venting, air admission, drier regeneration, and for the acoustics of the compressed air supply device is obtained for the series arrangement with the restricting means. In particular, it is possible, in the through-flow mode, for the controllable isolating valve to be subjected to closed-loop and/or open-loop control with respect of a flow rate of a compressed air flow such that an explosive release of air is avoided, even in the case of relatively quick venting operations. There would be a risk of explosive air release in a compressed air supply device whenever an excessively large volume of compressed air is released at too high a pressure within too short a time.

It has been found that a configuration and matching of first and second control states can advantageously be used to implement an effective nominal width of the series arrangement comprising the restricting means and the controllable isolating valve. Thus, in one advantageous embodiment, it is possible, in the through-flow mode, that at least the controllable isolating valve can be switched over between the first and the second control state such that an effective nominal width of the series arrangement is below an actual nominal width of the restricting means. In this embodiment, it is possible in practice, by means of the series arrangement, to obtain an adjustable electromagnetically controllable restrictor, while nevertheless ensuring that the pneumatic connection can be cut off bidirectionally and completely. In this way, advantageous aspects of the embodiments of the present invention are achieved. In addition, it is advantageously possible to adjust the flow rate for the controllable isolating valve under closed-loop and/or open-loop control in the through-flow mode.

It is particularly advantageous that a flow rate of a compressed air flow can additionally be subjected to open-loop and/or closed-loop control for the controllable vent valve (if appropriate, in a manner matched to the state of the controllable isolating valve). In particular, the controllable vent valve can be subjected to closed-loop and/or open-loop control with respect to a flow rate of a compressed air flow in the through-flow mode. To achieve this, the controllable isolating valve and/or the controllable vent valve can preferably be subjected to closed-loop and/or open-loop control in a manner matched to one another. In particular, the controllable isolating valve and/or the controllable vent valve can be connected to a controller, and more particularly, a common electronic controller. In principle, however, two coupled electronic controllers can be provided, being set up such that a control state of the vent valve is matched to a control state of the isolating valve.

The controller can specify a control state of the isolating valve and/or of the vent valve by means of a wide range of parameters. The parameters can be detected within a sensor system, for example, or can be taken from an ECU or some other vehicle controller or from a heuristic system. It is particularly advantageous if the controllable isolating valve and/or the controllable vent valve can be subjected to closed-loop and/or open-loop control by means of an electronic controller in accordance with an air admission or air release situation. In this context, a state of the drier, in particular a requirement for drier regeneration, is preferably taken into account. It is particularly advantageous if circumstances that affect the acoustics of the compressed air supply device, in particular possible circumstances that are responsible for an explosive release of air, are taken into account.

State values, such as a gallery pressure, a discharge characteristic of the pneumatic installation, a switching speed of the isolating valve and/or of the vent valve, or a value of a difference between the setpoint and the actual value of a compressed air supply device and/or pneumatic installation can preferably be used.

In principle, a first control state and/or a second control state can be adjusted in a variable manner. This allows a variable time characteristic of a switching operation or of a switching amplitude at least of the controllable isolating valve, for example. Thus, for example, the controllable isolating valve can be capable of being switched over continuously between the first and the second control state. It is also possible, for example, for a switching speed and/or an overall opening time and/or an overall closing time of an isolating valve to be adjusted in an advantageous manner.

It has also proven advantageous that at least the controllable isolating valve can be switched over backward and forward between the first and the second control state at a clock rate of a control state change. In particular, different clock rates of a control state change can be provided. For example, the controllable isolating valve can be switched over backward and forward between the first and the second control states at a first clock rate in a first time segment and can be switched over backward and forward at a second clock rate in a second time segment. It is thus possible by electronic means to obtain one or more effective nominal widths for the series arrangement comprising the restricting means and the controllable isolating valve in accordance with the advantageous embodiment described above. In principle, a clock rate of a control state change can advantageously be used to set a suitable effective nominal width of the series arrangement. It has been found that a clock rate of between 4 Hz and 20 Hz is particularly suitable for setting an effective nominal width such that a comparative improvement in the acoustics and regeneration capacity of the drier is made available by means of the series arrangement of the compressed air supply device. In the frequency range indicated, the clock rate of a control state change can realistically be converted into a backward and forward movement of the armature at the clock rate, even given the inert mass of the armature of the controllable isolating valve.

Fundamentally, the term "restricting means" should be taken to mean any means that restricts a line cross section of the main pneumatic line. A preferred nominal width of the main pneumatic line is greater than 4 mm. The restricting means preferably has an actual nominal width, defined by the smallest clear restrictor cross section, of greater than 0.6 mm. Depending on the line cross section of the main pneumatic line, a restrictor cross section can be up to 8 mm. An actual nominal width of the restricting means is preferably between 1 and 3 mm, in particular 2.5 mm. According to one preferred embodiment of the present invention described above, an effective nominal width of the series arrangement comprising the restricting means and the controllable isolating valve is less than the actual nominal width, thus specified, of the restricting means.

In one preferred embodiment, the restricting means is formed as a restrictor separate from the isolating valve. As described above, these can fundamentally be any kind of variation in the line cross section of the main pneumatic line or can be a specially designed restricting device. It is also possible for a restricting means to be formed in the isolating valve and/or in another valve, e.g., by means of an aperture of a valve seat of the isolating valve and/or of the further valve.

It is particularly advantageous if the controllable isolating valve and/or the controllable vent valve are switched over between the first and the second control states by means of a control signal. The control signal is preferably in the form of a pulse width modulated control signal (PWM control signal). The control signal is advantageously in the form of a current and/or voltage signal. A PWM control signal with a suitable frequency and a suitable pulse/no pulse ratio is preferably made available. A frequency of between 5 kHz and 20 kHz and a pulse/no pulse ratio of between 1:100 and 100:1 that can be adjusted in sufficiently fine steps is preferred. If required, a somewhat coarser pulse/no pulse ratio of between 1:10 and 10:1 may also be sufficient.

According to the above-mentioned development, a first PWM control signal can be assigned to a first control state of an isolating valve and/or of a vent valve, and a second PWM control signal can be assigned to a second control state of an isolating valve and/or of a vent valve, for example. By means of a frequency and/or a pulse/no pulse ratio of a clocked control signal, in particular a PWM control signal, an effective nominal width of the series arrangement can advantageously be adjusted.

The controllable isolating valve and/or the controllable vent valve is/are preferably set up to be controlled by means of a control signal common to both. For this purpose, the switching point and the switching states of the isolating valve and/or the vent valve can advantageously be matched to one another. The switching points and the switching amplitudes of the isolating valve and the vent valve can be formed by the control signals and/or by suitably designed valve springs.

In the isolating mode, the controllable isolating valve and the vent valve are preferably closed when de-energized. In particular, it has proven advantageous for the vent valve to move to a through-flow mode only after the isolating valve has switched to the open state. This advantageously makes it possible to avoid an explosive release of air since a partial pressure relief can take place first through the opening of the isolating valve, before the vent valve opens. Thus, the vent valve opens at a relatively low pressure amplitude, which advantageously reduces an acoustic effect.

In one preferred embodiment, the vent valve, which can be a directly switched valve, is part of a solenoid valve arrangement for directly switching the compressed air volume, wherein the solenoid valve arrangement is free of a control valve. In other words, the solenoid valve arrangement according to this embodiment is used to obtain a directly controlled solenoid vent valve arrangement. It has been found that direct switching of an overall compressed air volume means that the switching time of the directly controlled solenoid vent valve arrangement can be below that of indirectly controlled solenoid vent valve arrangements (i.e., for vent cross sections of the same size). As is evident from this embodiment, this has advantages when venting the compressed air supply device while regenerating the air drier.

In another preferred embodiment, the vent valve, which can be an indirectly switched relay valve, is part of a solenoid valve arrangement for indirectly switching a compressed air volume. The solenoid valve arrangement has a control valve for controlling the relay valve, the control valve being subjected to a pressure of the main pneumatic line. In a first preferred modification, the pressure can be a total pressure in the main pneumatic line. In a second modification, the pressure can also be a partial pressure in the main pneumatic line. In other words, the solenoid valve arrangement according to this preferred embodiment is used to obtain an indirectly controlled solenoid vent valve arrangement. It has been found that a control pressure can be kept relatively low through indirect switching of an overall compressed air volume. As is evident from the first modification, it is nevertheless possible to achieve a relatively quick switching action of the vent valve by using a total pressure in the main pneumatic line.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Illustrative embodiments of the present invention are explained in greater detail below with reference to the accompanying drawings, in which:

FIG. 1 is a circuit diagram of a pneumatic system having a first variant of a compressed air supply device that comprises a vent valve as part of a solenoid valve arrangement for directly switching a compressed air volume, a pneumatic connection that runs between a compressed air feed and a compressed air port leading to a pneumatic installation, and a single isolating valve in accordance with an embodiment of the invention;

Figure 2A:
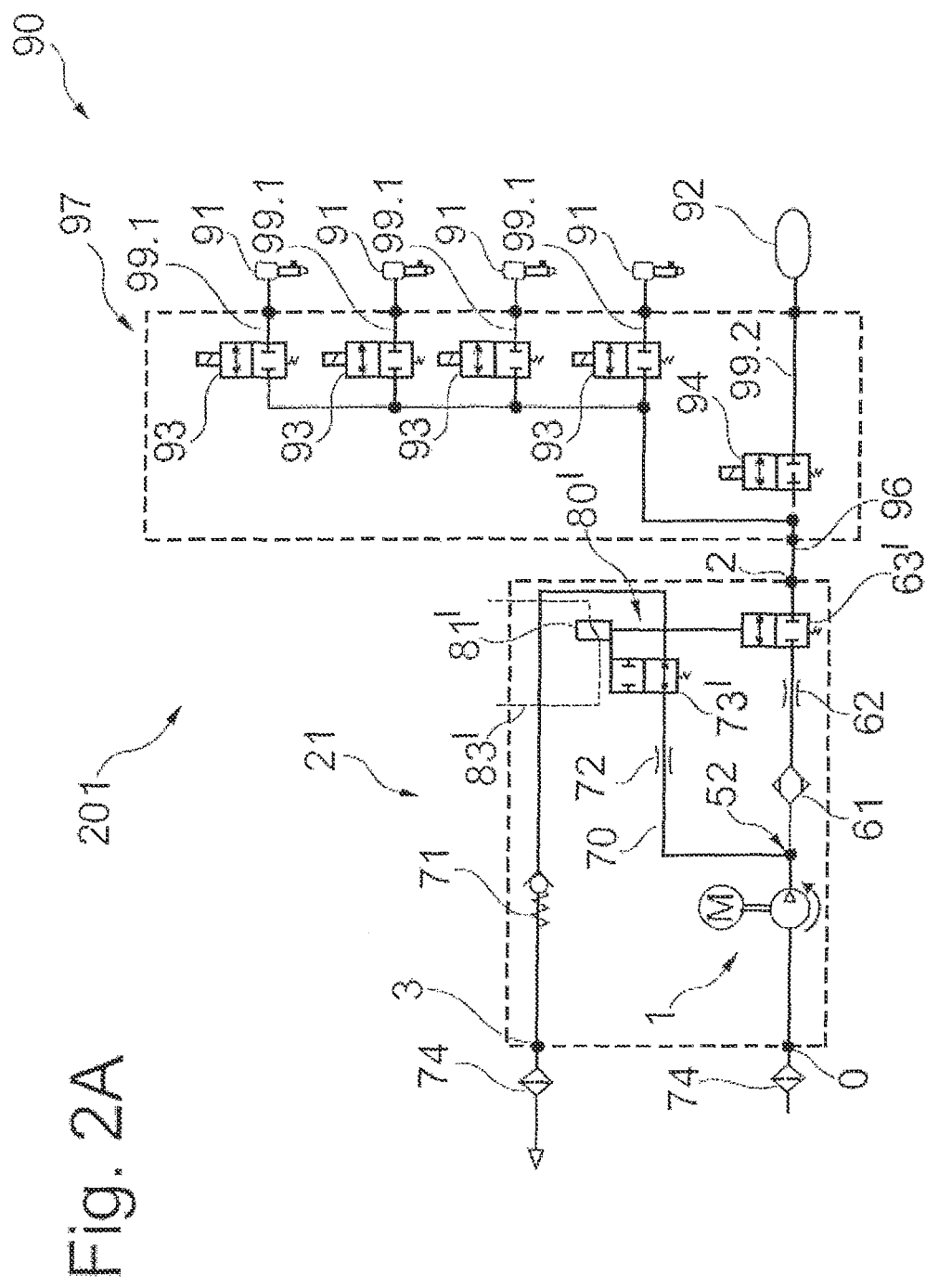
FIG. 2A is a circuit diagram of a pneumatic system having a compressed air supply device that is similar to that in FIG. 1, where the vent valve and the isolating valve are formed as a double armature solenoid valve, where the vent valve is open when de-energized, and where the isolating valve is closed when de-energized in accordance with an embodiment of the invention.

LIST OF REFERENCE
NUMBERS/CHARACTERS 0 air feed
1 compressed air feed
2 compressed air port
3 vent port
11, 21, 22, 23, 24, 25, 30, 41 compressed air supply device
31 first region
32 second region
33 third region
34 drying canister
51 air compressor
52 compressed air feed port
60 main pneumatic line
61 air drier
62 first restrictor/restricting means
63, 63', 63", 63''', 63$^{IV}$, 163 controllable isolating valve
631, 632 isolating valve arrangement
70 vent line
71 nonreturn valve
72 second restrictor
73, 73', 73", 73''', 73$^{IV}$, 173 vent valve
74 filter
80, 80', 80", 80''', 80$^{IV}$, 180, 800, 800' solenoid valve arrangement
81, 81', 81" first coil
82 second coil
83, 83', 83", 83''', 83$^{IV}$, 183, 84.1, 84.2 control line
90, 901, 902 pneumatic installation
91 bellows
92 reservoir
93 bellows solenoid valve ahead of bellows 91
94 reservoir solenoid valve ahead of reservoir 92
95 gallery line
96 pneumatic line
97 valve block
98 pressure sensor
99 sensor branch line
99.1 bellows branch line
99.2 reservoir branch line
101, 201, 202, 203, 204, 300, 401, 501, 502 pneumatic system
160 branch line leading off from the main pneumatic line
170 further branch line
175 control valve
190 PWM control signal
190.1 first signal region
190.2 second signal region
190.3 third signal region
191 voltage signal
192 current signal A, B, C housing part
D seal
E0 air feed interface
E1 compressed air feed interface
E2 compressed air supply interface
E3 vent interface
F spring
G recess
$I_H$ holding current
$I_R$ reset current
$I_S$ switching current
M motor
MVA solenoid valve arrangement
P venting flow
$\overline{P}$ supply flow
S control interface
SA current amplitude
$SA_1$ first current amplitude, switching point
$SA_2$ second current amplitude, switching point
$SA_3$ third current amplitude, switching point
$SA_4$ fourth current amplitude, switching point
T cover
W wall
t time characteristic
$t_1$ pulse width
$t_2$ interpulse width
$t_3$ pulse width
$t_4$ interpulse width
$t_5$ pulse width
$t_6$ interpulse width
$t_R$ time
$t_S$ time
$X_{ES}$ detail
ES equivalent circuit diagram
U control state change
X, Y, Z port
I primary valve
II secondary valve
Ia first sealing element
IIa second sealing element
Ib primary armature
IIb secondary armature
Ic, IIc valve spring
Id, IId valve seat
III coil former
(i), (ii) first, second control state
$N_{eff}$ effective nominal width

DETAILED DESCRIPTION OF THE PREFERRED
EMBODIMENTS

FIG. 1 shows a pneumatic system 101 having a compressed air supply device 11 and a pneumatic installation 90, in the present case, in the form of an air spring installation. The air spring installation has a total of four "bellows" 91, which are each assigned to one wheel of a vehicle (not shown specifically) and form an air spring for the vehicle. Moreover, the air spring installation has a reservoir 92 for storing rapidly available compressed air for the bellows 91. Respective bellows solenoid valves 93 are arranged ahead of the bellows 91 in respective bellows branch lines 99.1, each of the valves serving as an air spring valve for opening or closing an air spring formed by a bellows 91. A reservoir solenoid valve 94 as a reservoir valve is arranged ahead of the reservoir 92 in a reservoir branch line 99.2. The bellows solenoid valves 93 and the reservoir solenoid valve 94 are connected by means of the bellows and reservoir branch lines 99.1, 99.2 to a common pneumatic line forming a gallery line 95. The gallery line 95 is connected pneumatically to a compressed air port 2 of the compressed air supply device 11 by a further pneumatic line 96. In the present case, the bellows solenoid valves 93 serving as level control valves, together with the reservoir solenoid valve 94, are arranged in a valve block 97 having five valves. Various modified embodiments (not shown here) can include different arrangements of the bellows solenoid valves 93 and the reservoir solenoid valve 94. For example, fewer solenoid valves can be used in the valve block 97. In the present case, the pneumatic installation 90 is provided with a pressure sensor 98 that is connected to the gallery line 95 by a sensor branch line 99.3, enabling a pressure in the gallery line 95 of the pneumatic installation 90 to be measured by means of the pressure sensor 98. In general terms, a gallery should be taken to mean any kind of header pipe from which branch lines or other pneumatic installations start.

In FIG. 1, the bellows solenoid valves 93 and the reservoir solenoid valve 94 are shown in a de-energized state, wherein the bellows solenoid valves 93 and the reservoir solenoid valve 94 are formed as solenoid valves that are closed when de-energized.

The compressed air supply device 11 is used to operate the pneumatic installation 90. The compressed air supply installation 11 has a compressed air feed 1 and a compressed air port 2 leading to the pneumatic installation 90. In the present case, the compressed air feed 1 is formed with an air feed 0, an air compressor 51, and a compressed air feed port 52 by means of a suitably designed interface. The air compressor 51 is driven by a drive, in the present case, in the form of a motor M. In the present case, the pneumatic connection between the air feed 1 and the compressed air port 2 is formed by a single main pneumatic line 60, which is connected, on the one hand, to the compressed air feed port 52 and, on the other hand, to the compressed air port 2. At the port 2, the pneumatic connection is continued by the further pneumatic line 96 leading to the gallery line 95. An air drier 61, a first restrictor 62, and a controllable isolating valve 63, in the form of a 2/2-way valve configured as a solenoid valve, are arranged in the main pneumatic line 60. The restrictor 62 and the isolating valve 63 form a pneumatic series arrangement in the main pneumatic line 60.

The compressed air supply device 11 furthermore has a vent line 70, which is connected pneumatically to the main pneumatic line 60 and to a vent port 3 leading to the environment. Arranged ahead of the vent port 3 is a vent valve 71 arranged upstream in the vent line 70. In the present case, the vent line 70 is connected to the main pneumatic line 60 at the compressed air feed port 52. A second restrictor 72 and a controllable vent valve 73, which, in this case, is open when de-energized, is arranged in the vent line 70 in the direction of the vent port 3. A filter 74 is arranged after the vent port 3 leading to the environment. In a similar way, a filter (not shown here) can be arranged ahead of the air feed 0.

The compressed air supply device 11 shown in FIG. 1 provides the vent valve 73 as a single, directly switched valve for directly switching a compressed air volume in the vent line 70. There is no additional control valve provided in the compressed air supply device 11.

The vent valve 73 is part of a solenoid valve arrangement 80 formed with the isolating valve 63. The solenoid valve arrangement 80 provides a first coil 81 for the controllable isolating valve 63 and a second coil 82, formed separately from the first coil 81, for the controllable vent valve 73. In particular, the first coil 81 and the second coil 82 are each formed with a separate coil former. However, the controllable isolating valve 63 and the controllable vent valve 73 are set up to be controlled by means of a control signal common to both via a control line 83 common to both. In the present case, the second coil 82 does not have a separate control line, but is instead connected to the control line 83.

Figure 2B:
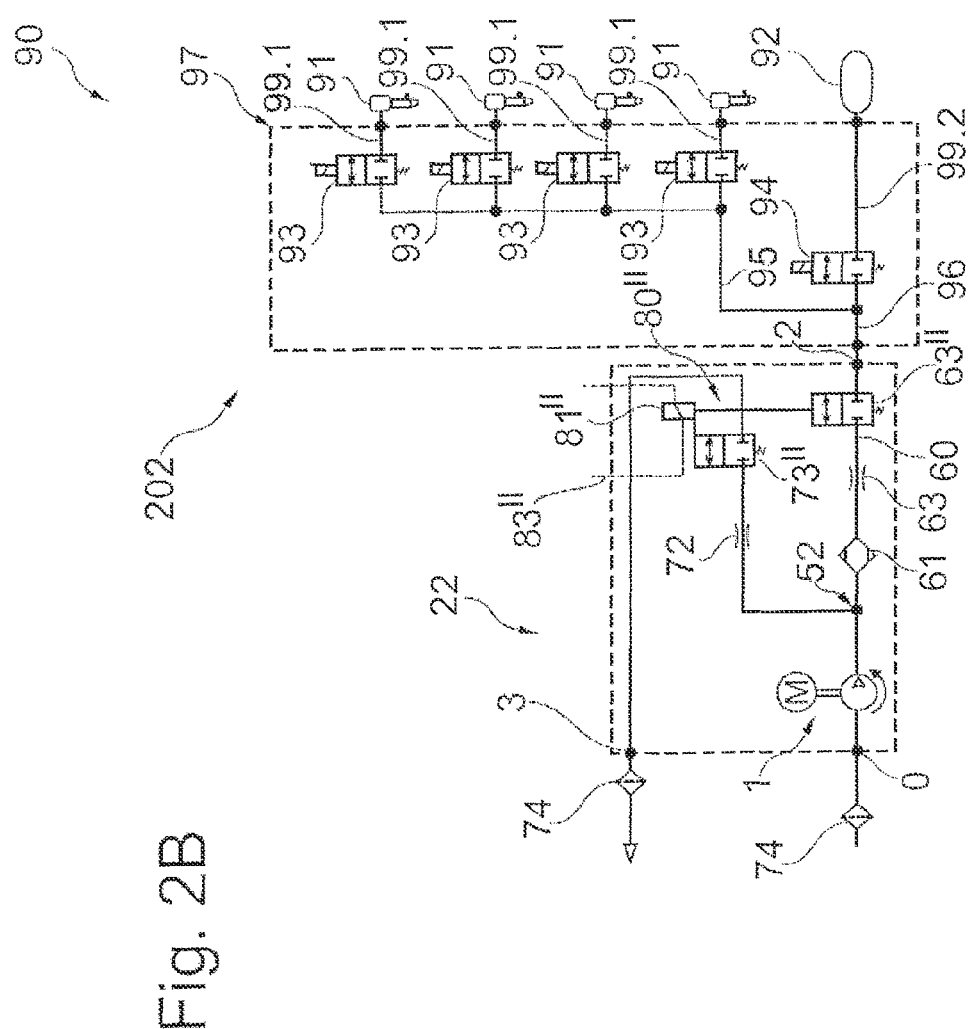
FIG. 2B is a circuit diagram of a pneumatic system having a compressed air supply device that is similar to that in FIG. 1, where the vent valve and the isolating valve are formed as a double armature solenoid valve, and where the vent valve and the isolating valve are both closed when de-energized in accordance with an embodiment of the invention.

FIGS. 2A and 2B, described in more detail below, show pneumatic systems 201, 202 each having a pneumatic installation 90 and a respective one of compressed air supply installations 21 and 22. The compressed air supply devices 21, 22 are constructed in a manner substantially similar to compressed air supply device 11, with the same reference signs being used for identical or similar parts or parts of identical or similar function. To this extent, attention is drawn to the description of compressed air supply device 11; it is primarily the differences with respect to compressed air supply device 11 that will be explained below.

Compressed air supply device 21 has a solenoid valve arrangement 80' with a controllable isolating valve 63' and a controllable vent valve 73'. The isolating valve 63' and the vent valve 73' are again designed as 2/2-way valves, with the isolating valves 63, 63' being embodied as directional control valves that are closed when de-energized and the vent valves 73, 73' being embodied as directional control valves that are opened when de-energized. In the present case, in contrast to the solenoid valve arrangement 80 of compressed air supply device 11, the controllable isolating valve 63' is formed with a first coil and the controllable vent valve 73' is formed with a second coil in the solenoid valve arrangement 80' of compressed air supply device 21, with the first and second coils (in the present case, represented symbolically as coil 81') being formed with a single coil former common to both coils. The coil 81' is once again connected to a controller (not shown) or to a control module (also not shown) by means of a control line 83', similar to the control line 83. The controller or control module can be part of a vehicle controller (e.g., ECU) or can be connected to the vehicle controller. As in compressed air supply device 11, the same controller or control module is available both for the isolating valves 63, 63' and the vent valves 73, 73'. In particular, the coil 81' of compressed air supply device 21 is controlled via the control line 83' by means of a control signal common to the isolating valve 63' and the vent valve 73'.

A compressed air supply device 22 of substantially similar construction as part of a pneumatic system 202 is shown in FIG. 2B. In contrast to compressed air supply device 21, compressed air supply device 22 has a solenoid valve arrangement 80" with an isolating valve 63" and a vent valve 73", with both the vent valve 73" and the isolating valve 63" being formed as 2/2-way valves that are closed when de-energized.

In the embodiments of the compressed air supply devices 11, 21, 22 shown in FIGS. 1-2B, the controllable isolating valves 63, 63', 63" are switched to an open state in a through-flow mode. Otherwise, in the present case, in the de-energized state as shown, the isolating valves 63, 63', 63" are in closed states, with the result that the pneumatic connection in the form of the main pneumatic line 60 and the further pneumatic line 96 is bidirectionally and completely closed. In other words, the main pneumatic line 60 is completely cut off from the further pneumatic line 96 leading to the gallery line 95. That is, the isolating valves 63, 63', 63" isolate a gallery line 95 as well as bellows 91 connected thereto, the reservoir 92, and/or other pressure chambers from the main pneumatic line 60. This complete decoupling of the compressed air supply devices 11, 21, 22 from the pneumatic installation 90 when the isolating valves 63, 63', 63" are de-energized and closed allows advantageous operation of the pneumatic installation 90 without the compressed air supply devices 11, 21, 22 being influenced thereby. Owing to the decoupling brought about by the isolating valves 63, 63', 63", in the present case, in the de-energized and closed state, disadvantageous influences on the compressed air supply devices 11, 21, 22 due to the operation of the pneumatic installation 90 are avoided and the pneumatic installation 90 can be operated independently of the operation of the compressed air supply devices 11, 21, 22.

For this reason, both air admission to and air release from the pneumatic installation 90 are prevented when the isolating valves 63, 63', 63" are in closed states, i.e., the pneumatic connection comprising the main pneumatic line 60 and the further pneumatic line 96 is bidirectionally and completely closed for a compressed air flow. In the present case, the pneumatic connection between the air drier 61 and the gallery line 95 is bidirectionally and completely closed in the closed state of the isolating valves 63, 63', 63". Among the advantageous effects of this is that the relatively large volume of the air drier 61 can be left out of account for states of the pneumatic installation 90 and, conversely, the air drier 61 is not affected in the event of movements of compressed air in the pneumatic installation 90.

Figure 3A:
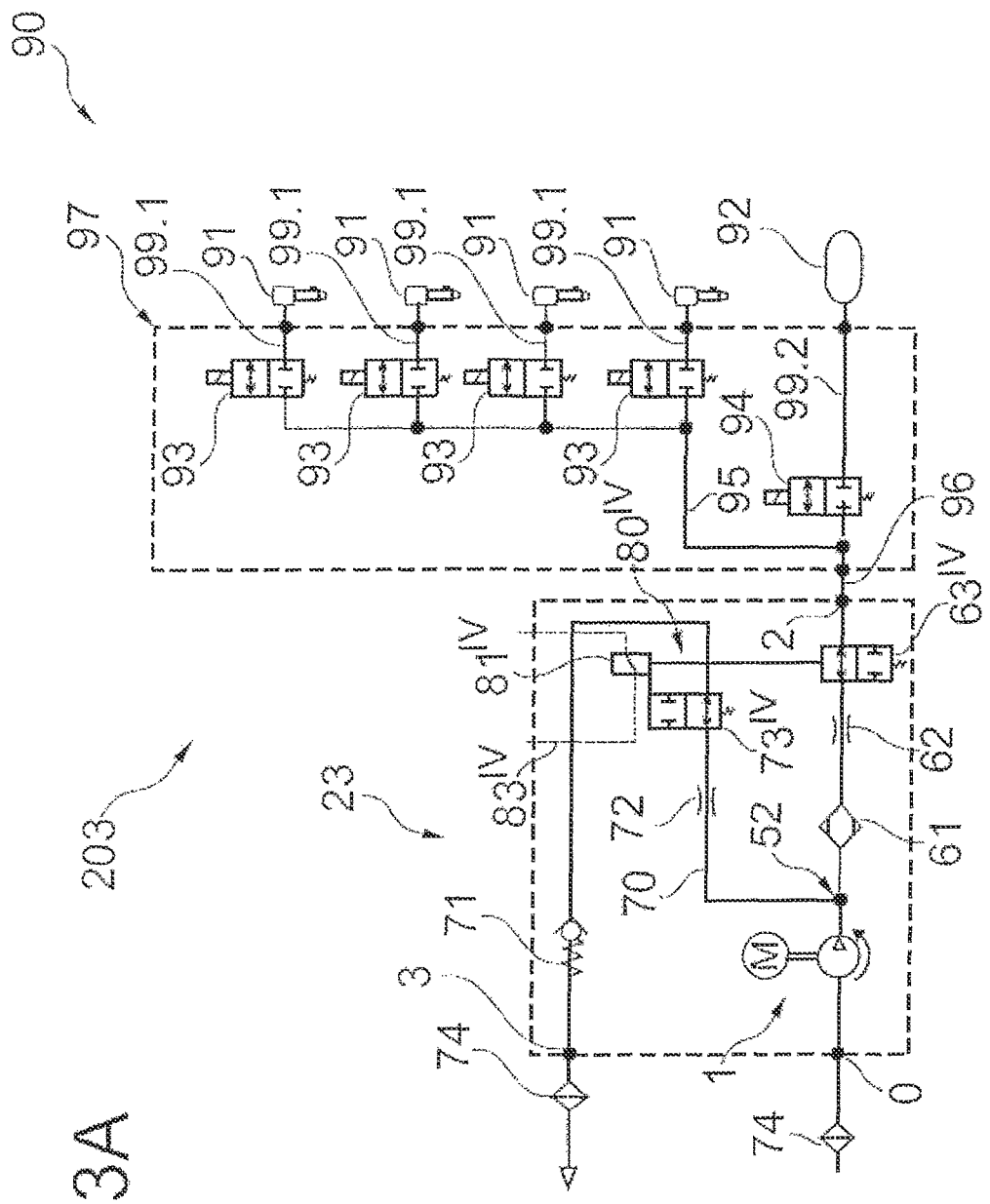
FIG. 3A is a circuit diagram of a pneumatic system having a compressed air supply device that is similar to that in FIG. 2A, but where the vent valve and the isolating valve are both open when de-energized in accordance with an embodiment of the invention.
Figure 3B:
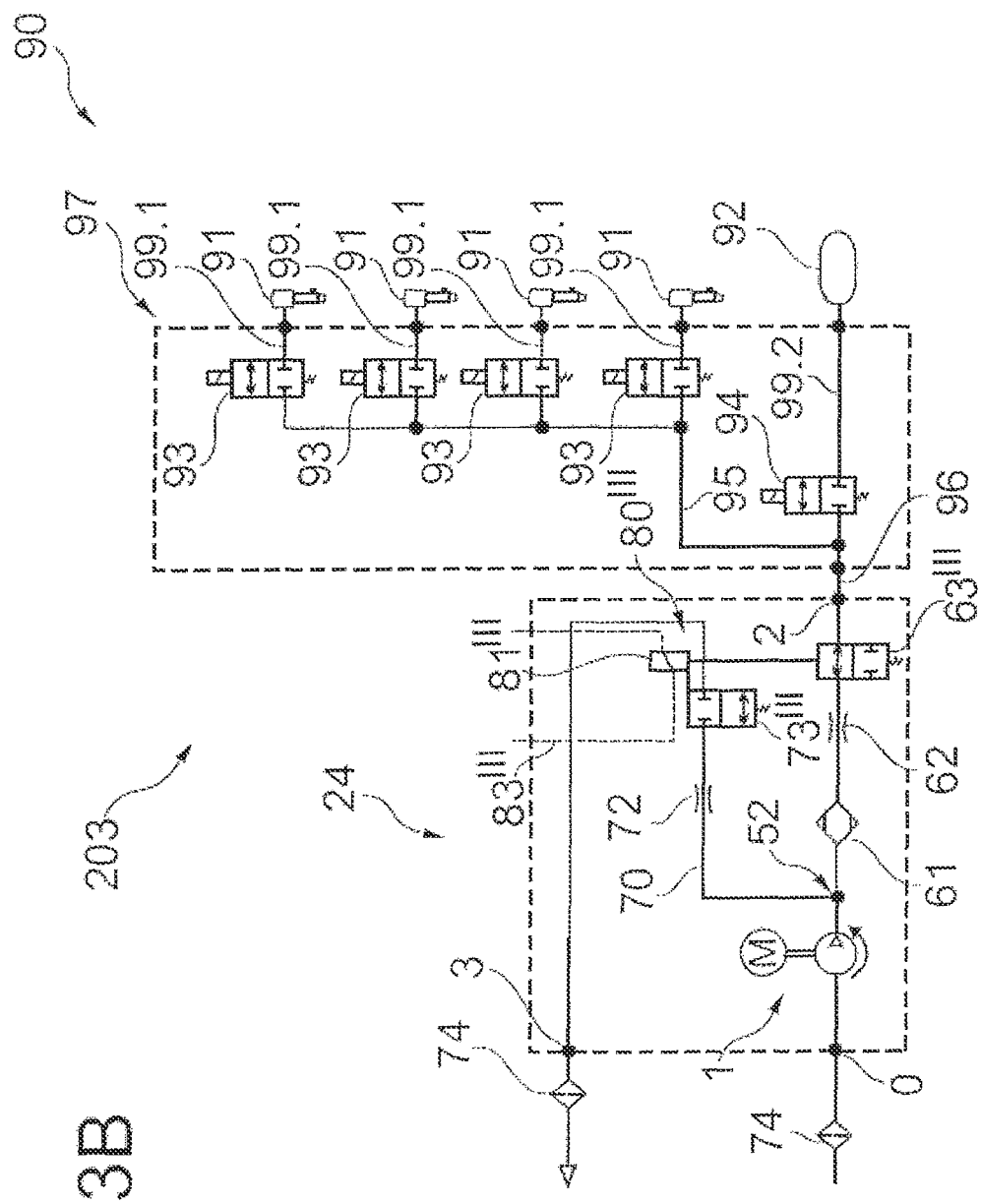
FIG. 3B is a circuit diagram of a pneumatic system having a compressed air supply device that is similar to that in FIG. 2B, but where the vent valve is closed when de-energized, and where the isolating valve is open when de-energized in accordance with an embodiment of the invention.

FIGS. 3A and 3B show pneumatic systems 203 and 204 having modified compressed air supply devices 23 and 24, respectively. While otherwise being similar to compressed air supply devices 21, 22, compressed air supply devices 23, 24 are formed with solenoid valve arrangements 80''' and $80^{IV}$ respectively, with isolating valves 63''' and $63^{IV}$ being embodied as 2/2-way valves that are open when de-energized. The 2/2-way valves can be implemented for the solenoid valve arrangements 80''' and $80^{IV}$ in combination with vent valves 73''' and $73^{IV}$ as 2/2-way valves that are either closed or open when de-energized. In the case of vent valves 73, 73', $73^{IV}$ that are open when de-energized, a nonreturn valve 71 is provided in the vent line 70 in order to close the compressed air supply device 11, 21, 23 with respect to the environment.

Figure 4:
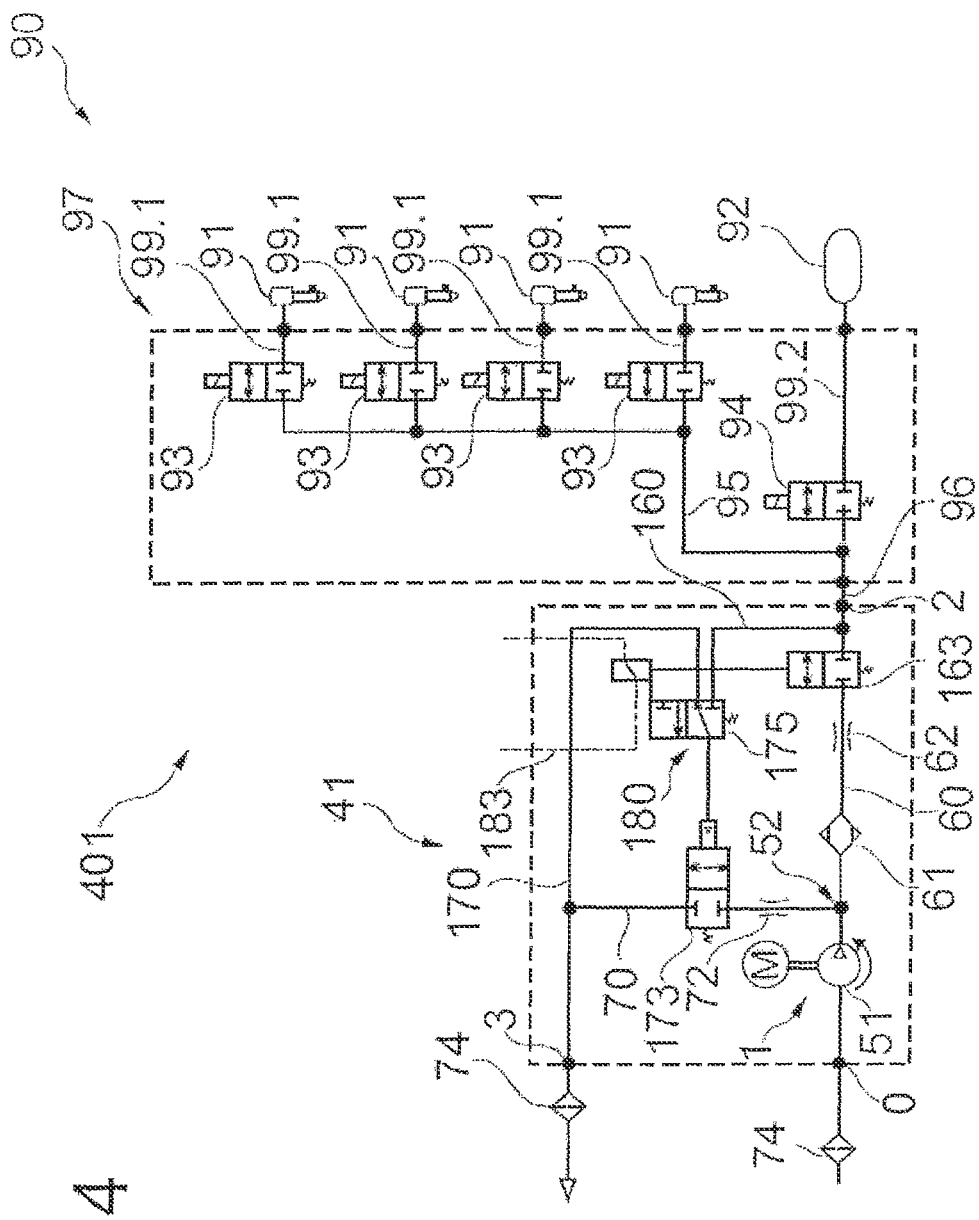
FIG. 4 is a circuit diagram of a pneumatic system having a second variant of a compressed air supply device that comprises a vent valve as part of a solenoid valve arrangement for indirectly switching a compressed air volume, a pneumatic connection that runs between a compressed air feed and a compressed air port leading to a pneumatic installation, and a single isolating valve, where the solenoid valve arrangement has a control valve subjected to a total pressure of a main pneumatic line to control a relay valve in accordance with an embodiment of the invention.

FIG. 4 shows a compressed air supply device 41 that is part of a pneumatic system 401 for supplying a pneumatic installation 90. The same reference signs are used for identical or similar parts or parts of identical or similar function. It is, in particular, the differences with respect to compressed air supply devices 11, 21, 22, 23, 24 that are explained below and, otherwise, attention is drawn to the previous descriptions. Once again, compressed air supply device 41 has a main pneumatic line 60 and a vent line 70. As in the various embodiments explained above, an air drier 61, a first restrictor 62, and a controllable isolating valve 163 are arranged in the main pneumatic line 60. The controllable isolating valve 163 and the restrictor 62 form a series arrangement in the main pneumatic line 60 such that the pneumatic connection comprising the main pneumatic line 60 and the pneumatic line 96 can be bidirectionally and completely closed for a compressed air flow. The vent line 70 is connected to the main pneumatic line 60 at a compressed air feed port 52 and has a controllable vent valve 173 between the compressed air feed port 52 and the vent port 3. In contrast to the embodiments explained above, however, the isolating valve 163 and the vent valve 173 are part of a solenoid valve arrangement 180 for indirectly switching a compressed air volume. In this case, the vent valve 173, as an indirectly switched relay valve, is part of the solenoid valve arrangement 180, which is controlled by a control valve 175. In the present case, the control valve 175 is subjected to a total pressure of a pressurized flow in the main pneumatic line 60 via a branch line 160 starting from the main pneumatic line 60. Depending on the design of the first restrictor 62, the control valve 175 can also be subjected to a partial pressure of the main pneumatic line 60.

A control valve 175 subjected to only a partial pressure for controlling the relay valve 173, in particular, allows relatively quick venting of the compressed air supply device 41, since a pilot control pressure is relatively low. In the present case, the control valve 175 of the solenoid valve arrangement 180 is configured to close when de-energized. Depending on the design of the restrictor 62, the control current, to switch the control valve 175 to the open state for the branch line 160 so as to bring the relay valve 173 into a pilot-controlled state, will be higher or lower. Depending on the design, it then requires only a minimal operating pressure to transfer the relay valve 173 into the open state. The advantage of a quick-venting solenoid valve arrangement 180 is that, by virtue of the relatively small nominal width of the first restrictor 62 in comparison with the larger nominal width of the second restrictor 72, only a small part of the total pressure of a compressed air volume in the main pneumatic line 60 is required to control the relay valve 173 via the control valve 175. Nevertheless, the main pressure volume is vented to the vent port 3 via the vent line 70, the restrictor 72, and the relay valve 173. One advantage of this quick-venting solenoid valve arrangement 180 in the compressed air supply device 41 is that it is not necessary to switch the entire compressed air volume by means of a single solenoid valve, but rather just a small part of a partial compressed air volume via the branch line 160 leading to the control valve 175 is sufficient. This design, more or less a valve arrangement that is in principle positively actuated, allows the operating pressure to be increased to a comparatively high pressure level and, at the same time, the switching of large compressed air volumes by means of the relay valve 173 is made possible. The relay valve 173 can be designed with a relatively large nominal width. Moreover, the ratio of the nominal width of the first restrictor 62 to the nominal width of the second restrictor 72 is formed such that effective regeneration of the air drier 61 is nevertheless possible when the compressed air supply device 41 is vented.

In the de-energized and closed state, the control valve 175 is open toward the vent port 3 via the further branch line 170, wherein the further branch line 170 is brought together with the vent line 70 ahead of the vent port 3.

Figure 5:
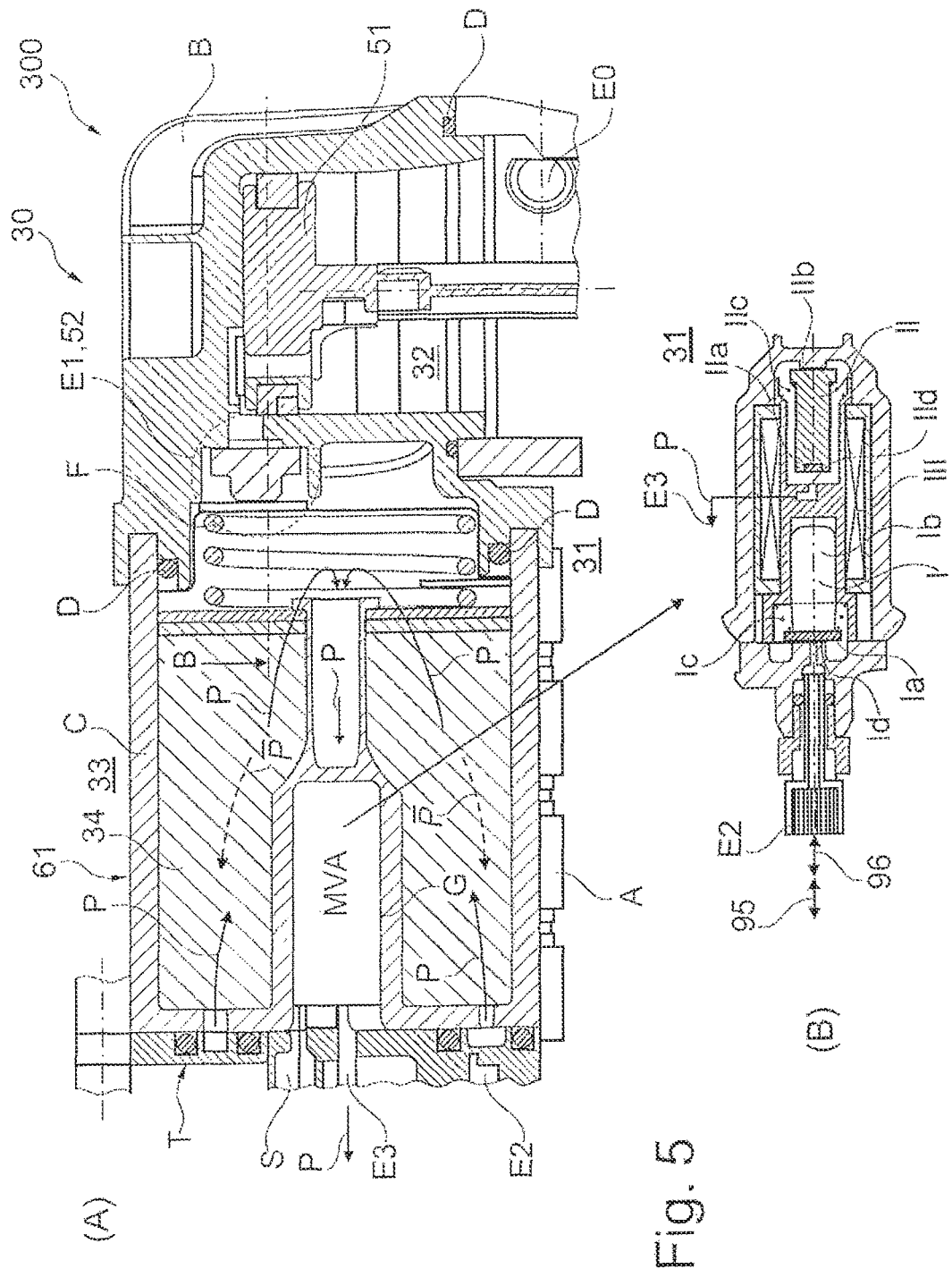
FIG. 5 are partial cross-sectional views (A) and (B) of the compressed air supply device of any of FIGS. 2A and 2B in accordance with an embodiment of the invention.

FIG. 5 shows, in a view (A), an embodiment of a compressed air supply device 30 as part of a pneumatic system (not shown). As shown in view (A), the compressed air supply device 30 includes a number of regions. A drive in the form of the motor M for driving the air compressor 51 (shown schematically in the second region 32) is arranged in a first region (also not shown). Here, the air compressor 51 has a piston (also not shown), which can be moved backward and forward in a compression chamber, and which can be driven by the motor M via a shaft and a connecting rod. In the compression chamber, air is fed in via an air feed interface E0 of the abovementioned air feed 0. Compressed air at the outlet of the compression chamber is transferred via a valve or a similar interface component to a compressed air feed interface E1 for the abovementioned compressed air feed 1. The compressed air feed interface E1 is assigned to the compressed air feed port as described above in various embodiments. The compressed air is then discharged into a third region 33 of the compressed air supply device that embodies the main pneumatic line 60 and vent line 70 with the internal components described above in various embodiments, in particular the solenoid valve arrangement MVA illustrated schematically in view (A) of FIG. 5. In principle, the solenoid valve arrangement MVA can be formed by any of the solenoid valve arrangements 80, 80', 80'', 80''', $80^{IV}$, 180 explained above or below. In particular, the third region 33 contains the air drier 61 with a drying canister 34, which is filled with desiccating granules, and through which a compressed air flow from the main pneumatic line 60 can flow, whether as a venting flow P or as a supply flow P̄. The regions are assigned corresponding housing parts A, B, C, which are sealed off from one another by one or more seals D, if appropriate. The third region 33 is, in particular, assigned a housing part C and a cover T, which closes off housing part C at the end. The cover T forms a compressed air supply interface E2 for the abovementioned compressed air port 2 leading to the pneumatic installation 90. As explained, the compressed air port 2 leads to the further pneumatic line 96 and to the gallery line 95. In the present case, the first restrictor 62, which is assigned to an isolating valve of the solenoid valve arrangement MVA, is formed within a defined nominal width as an aperture in the drying canister 34 and cover T. The cover T also forms a vent interface E3 for the abovementioned vent port 3. Finally, the cover T also forms an electrical control interface S for attachment of the abovementioned control line 83, 83', 83", 83'", 83$^{IV}$ to the solenoid valve arrangement MVA. The dimensions of the cover T are largely congruent with an end contour of the drying canister 34, and the cover can be mounted with an almost perfect fit on the drying canister 34.

Housing part C is formed by a wall W of the drying canister 34 that is filled with desiccating granules, and by the cover T. The desiccating granules are held together under pressure in the drying canister 34 by a spring F. At the end of the drying canister 34, the wall W in turn forms a recess G, which is arranged symmetrically and, in the present case, centrally and parallel to an axis of the drying canister 34. Vent valves 73, 73', 73", 73'", 73$^{IV}$, 173 and isolating valves 63, 63', 63", 63'", 63$^{IV}$, 163 in the form of the solenoid valve arrangement MVA, can be accommodated in the recess G, symmetrically with the axis of the drying canister 34. At the end, the cover T closes off the recess G in the leak-tight manner, together with the solenoid valve arrangement MVA situated therein.

By means of the illustrated U-shaped arrangement of the regions 31, 32, 33 and of the associated housing parts A, B, C, a space-saving compressed air supply device 30 is made available, which furthermore allows horizontal interfaces, namely as S, E0, E1, E2, E3. Moreover, weight saving is achieved by virtue of the fact that the outer contour of the drying canister 34 of the air drier 61 and the cover T are used as part of the housing arrangement of the compressed air supply device 30. In the present case, the solenoid valve arrangement MVA is surrounded on three sides in the recess G of the drying canister 34. From this, it can be seen that the recess G is free of desiccant. A venting flow P from the gallery line 95, the flow being indicated by solid arrows, can be passed via the compressed air supply interface E2 and the vent interface E3 in the cover T, if required. As shown by the symbolically indicated venting flow P, the air can flow through the air drier 61 in the opposite direction to a supply flow P̄ indicated by dashes in order to perform regeneration. The supply flow P̄ indicated by dashed arrows is used to supply the pneumatic installation 90 via the pneumatic line 96 and the gallery line 95 and flows from the compressed air feed interface E1 to the compressed air supply interface E2 of the compressed air port 2.

View (B) in FIG. 5 shows a solenoid valve arrangement MVA that is in the form of a double armature solenoid valve, in the present case, to form the solenoid valve arrangement 80' of FIG. 2A. In the double armature solenoid valve, a primary valve I is implemented, in one embodiment, to form the isolating valve 63', and in other embodiments, to form isolating valves 63, 63", 63'", 63$^{IV}$, 163 described above. A secondary valve II is likewise implemented in the solenoid valve arrangement MVA in the form of a double armature solenoid valve, in one embodiment, to form a vent valve 73', and in other embodiments, to form vent valves 73, 73", 73'", 73$^{IV}$, 173 described above. The primary valve I has a primary armature IIb, which carries a first sealing element Ia, and which is held on a valve seat Id of the primary valve I by a valve spring Ic. In the present case, the primary valve I is closed when de-energized and opens when the coil former III common to the primary valve I and the secondary valve II is energized, the coil former serving to form the coil (in the present case, coil 81') common to the primary valve I and the secondary valve II. In a similar way, the secondary valve II has a secondary armature IIb, which carries a second sealing element IIa of the secondary valve II, and is likewise arranged as a core of a coil common to the primary valve I and the secondary valve II, in the coil former III of the double armature solenoid valve. In the present case, the second sealing element IIa is raised from the valve seat IId by the valve spring IIc of the secondary valve II, and thus secondary valve II is a directional control valve that is open when de-energized. In particular, it is a 2/2-way valve similar to the vent valve 73' of compressed air supply device 21. As a result, in the present case, a pneumatic connection in the compressed air supply line 70 is open to the vent interface E3 of the vent port 3. Once again, the venting flow P is indicated symbolically as a solid arrow.

Using the double armature solenoid valve MVA, it is possible in a particularly advantageous manner to control both a controllable isolating valve (here, implemented as primary valve I) and the controllable vent valve (here, implemented as secondary valve II) by means of a control signal common to both in order, on the one hand, to open the primary valve I and, on the other hand, to close the secondary valve II upon energization. This is explained below by way of example with reference to FIG. 2A.

If compressed air from a compressed air flow is required, e.g., for raising a vehicle by filling the bellows 91 or for filling the reservoir 92, the primary valve I and the secondary valve II are switched on (i.e., the coil former III is supplied with a control signal in the form of a high control current sufficient to switch the primary and secondary valves I, II). As a result, the primary valve I switches through, i.e., opens. The secondary valve II goes from the open position to a blocking position. This functional position of the double armature solenoid valve thus allows filling of the pneumatic installation 90 from the compressed air feed 1. If, on the other hand, the pneumatic installation 90 is to be vented, e.g., to lower the vehicle, then, in the present case, only the primary valve I is switched on (i.e., the primary valve I opens, while the secondary valve remains in the open position thereof, as shown in FIG. 3B). A sufficiently low level for a corresponding control current is chosen to ensure that only the primary valve I switches. The nominal widths of the first restrictor 62 and the second restrictor 72 that are suitable for the air admission and venting functions, in the present case, a nominal width of 2.5 mm in each case, are formed through the formation of the nominal widths of the valve seats Id and IId of the primary valve I and of the secondary valve II, respectively.

Figure 6:
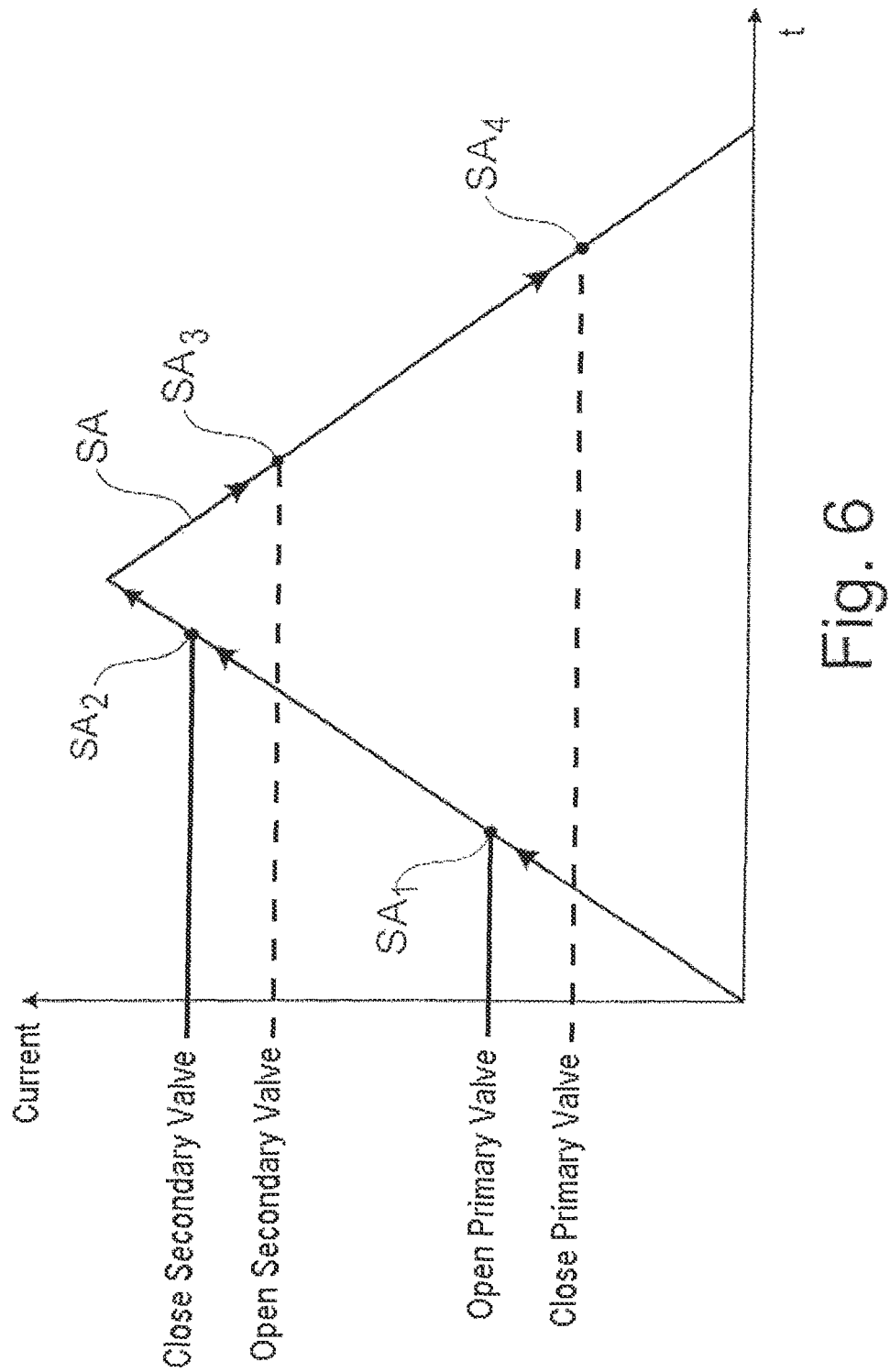
FIG. 6 is a graphical representation of a control signal, with respect to time, illustrating switching currents for the vent valve and the isolating valve in any of the compressed supply air devices of FIGS. 2A and 5, the control signal being obtained via a common control line for the valves in accordance with an embodiment of the invention.

FIG. 6 shows, by way of example, a symbolic representation of a current amplitude SA of a control current for switching a double armature solenoid valve MVA in the functional position (e.g., as shown in FIG. 2A) of a controllable isolating valve 63$^I$ in combination with a vent valve 73$^I$ that is open when de-energized for air admission to and venting of the pneumatic installation 90. In this case, the isolating valve 63$^I$ assumes the role of the primary valve I of a solenoid valve arrangement MVA, and the vent valve 73$^I$ assumes the role of the secondary valve II of the solenoid valve arrangement MVA. In the present case, the current amplitude SA is shown against a hypothetical time profile t and can be used, for example, for learning a precise switching point of the primary valve I and/or the secondary valve II. This can take place in the context of a diagnostic job for a vehicle controller ECU, for example. The graphic in FIG. 6 shows a regulated current amplitude SA, leading, when a first current amplitude $SA_1$ is exceeded, to the primary valve I passing (i.e. being switched over, from the de-energized and closed state to an open switching state), owing to the setting of a valve spring Ic of the primary valve I. When a second current amplitude $SA_2$ is exceeded, the current being higher in the present case, the secondary valve II switches in addition, i.e., makes a transition from the de-energized and open state to a switching state that corresponds to the closed state of the secondary valve II. If the control current amplitude is reduced, the secondary valve then opens when a third current amplitude $SA_3$ is undershot (taking into account a certain hysteresis), i.e., the secondary valve II then makes a transition from the energized and closed state to a switching state in which it is once again open, the state occurring at a lower energization level. When a fourth, in the present case, lower current amplitude $SA_4$ is undershot, the primary valve I makes a transition from the energized and open switching state back to the de-energized and closed switching state.

Learning of the current amplitudes $SA_1$, $SA_2$, $SA_3$, $SA_4$ as relevant switching points for an on/off switching state transition of the primary valve I and the secondary valve II can take place when the vehicle is started or, alternatively, only after replacement of a component or components. In fact, an exact identification of a point in time of a movement of a valve armature, namely of a primary armature Ib or of a secondary armature IIb, is not readily discernible. However, learning the switching points makes possible precise switching of the primary valve I and of the secondary valve II in the double armature solenoid valve arrangement MVA. A learning procedure can advantageously be stored as a diagnostic job in the vehicle controller, e.g., in a module of the vehicle controller, such as the ECU. Apart from the reversed pneumatic control state of the de-energized and closed vent valve $73^{II}$, the abovementioned profile can also apply to the double armature solenoid valve MVA in FIG. 2B. A possible sequence based on FIG. 2A could be as follows:

1. In the case of the second current amplitude $SA_2$: switch through primary valve I and secondary valve II and fill bellows 91.

2. In the case of the fourth current amplitude $SA_4$: switch off primary valve I and secondary valve II to de-energize them.

3. In the case of the first current amplitude $SA_1$: switch on primary valve I, i.e., isolating valve 63', and measure the pressure in the main pneumatic line 60 and/or in the pneumatic line 96 or the gallery line 95.

4. Slowly increase the current amplitude SA for primary valve I and secondary valve II. As the pressure drop begins, the first current amplitude $SA_1$ is reached by the primary valve I, i.e., the isolating valve 63' is opened, which opens the main pneumatic line 60 to the pneumatic line 96 and the gallery line 95, which can be observable from the start of the pressure drop.

5. Increase current amplitude SA further. If the pressure does not drop further, the result is that the second current amplitude $SA_2$ of the secondary valve II is reached. The result of the transition of the secondary valve II from the open switching state to the closed switching state is that the pressure ceases to fall.

By means of steps 4 and 5 above, the first and second current amplitudes $SA_1$, $SA_2$ of the switch-on currents are determined.

6. In a further step, the current amplitude SA is reduced again. If an initially constant pressure and then a decline in pressure is observed, the third current amplitude $SA_3$ for switching off the secondary valve II has been reached. Since the secondary valve II, which is formed as a vent valve $73^1$, opens, this is observable from the decline in pressure.

7. The current amplitude SA is reduced further until there is no further decline. The fourth current amplitude $SA_4$ that is now present corresponds to the switching current for switching off the primary valve I, i.e., the switching current is below the current amplitude $SA_4$ at which the primary valve I, namely the isolating valve 63', closes, and compressed air remains in the compressed air supply device.

The current amplitudes $SA_1$, $SA_2$, $SA_3$, $SA_4$ precisely determined in this way for switching points can be used for the further, optimized functional operation of the primary valve I and of the secondary valve II, i.e., in the present case, of an isolating valve 63' and of a vent valve 73'. Switching points for isolating valves 63, 63", 63''' $163^{IV}$, 163 and vent valves 73, 73", 73''', $73^{IV}$, 173 can be determined in a similar way.

Thus, for example, the function of the compressed air supply device 41 in FIG. 4 with respect to the isolating valve 163 and the vent valve 173 is similar to the functioning of the compressed air supply devices 11, 21, 22, 23, 24 described above. In particular, the current amplitudes for the switching currents with respect to a primary valve I (here, the isolating valve 163) and a secondary valve II (here, the control and relay valve arrangement comprising control valve 175 and relay valve 173) can be chosen according to a procedure similar to that described with respect to FIG. 6. Solenoid valve arrangement 180, rather than the solenoid valve arrangement MVA in view (A) of FIG. 5 is likewise possible, and therefore, a relatively compact embodiment of solenoid valve arrangement 180 in a compressed air supply device 41 is also possible.

A sequence of current amplitudes for changing the switching states of the isolating valves 63''', $63^{IV}$ and of the vent valves 73''' or $73^{IV}$ can likewise be chosen in a manner similar to the current amplitudes shown in FIG. 6, but the switching states of the valves 63''', 73''' and $63^{IV}$, $73^{IV}$ are correspondingly different. In the case of a current amplitude $SA_1$, for example, the isolating valve 63''' or $63^{IV}$ acting as the primary valve I is closed, with the result that, in the case of energization with a current amplitude $SA_1$, compressed air supply device 23 assumes a switching state that corresponds to the de-energized switching state of compressed air supply device 21. When solenoid valve arrangement 80''' is energized with a current amplitude $SA_1$, solenoid valve arrangement 80''' will likewise assume a switching state that corresponds to the de-energized switching state of solenoid valve arrangement 80".

It should be appreciated that both solenoid valve arrangement 80''' and solenoid valve arrangement $80^{IV}$ can be implemented in a compressed air supply device 30 instead of the symbolically represented solenoid valve arrangement MVA.

Figure 7:
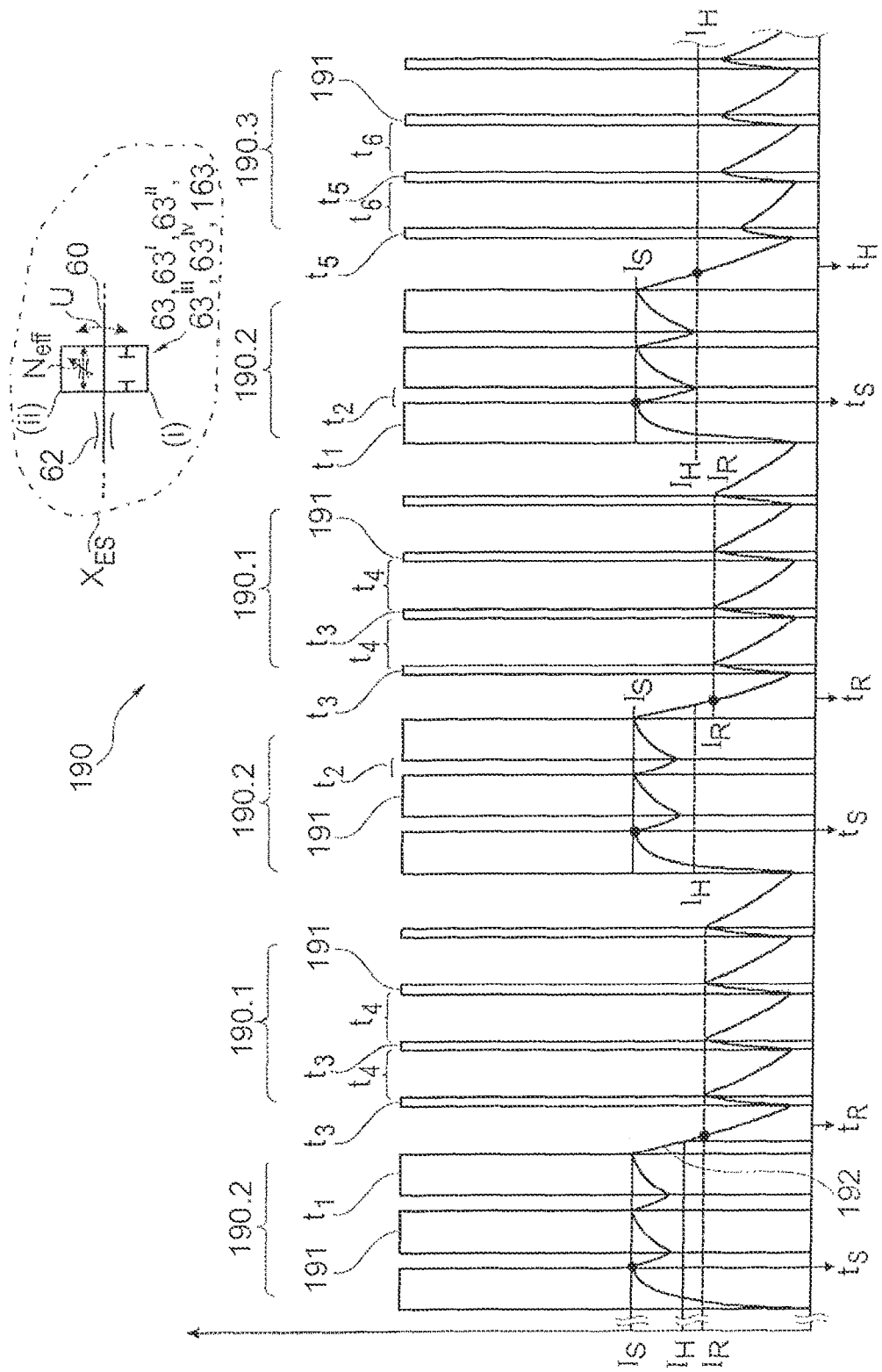
FIG. 7 is a simplified graphical representation of a time characteristic of a PWM control signal in the form of a voltage signal and of an associated current signal in relation to various threshold currents, illustrating a clock rate of a control state change for switching the isolating valve of any of FIGS. 2A and 5 between first and second control states in accordance with an embodiment of the invention.

FIG. 7 shows a graphical representation of a simplified time characteristic of a PWM control signal 190, illustrating switching of the controllable isolating valves 63, 63', 63", 63''', $63^{IV}$, 163 of FIGS. 1-4 between first and second control states in a through-flow mode. In the present case, a symbolic equivalent circuit diagram ES is shown in the detail $X_{ES}$ for the controllable isolating valves 63, 63', 63", 63''', $63^{IV}$, 163 in the main pneumatic line 60. In the detail $X_{ES}$, a control state change U resulting from the switchover process is indicated by a dashed double arrow. In this case, the first control state (i) is assigned to a state in which the valve is virtually closed when de-energized. In this case, the second control state (ii) is assigned to a state in which the valve is open when energized. A similar control signal can also be used, in a modified embodiment, to switch over vent valves 73, 73', 73", 73''', 73$^{IV}$, 173 between the first and second control states in the through-flow mode. In the case of the vent valves 73, 73', 73", 73''', 73$^{IV}$, 173, a first control state would be assigned to a closed state and a second control state would be assigned to an open state. In particular, the PWM control signal illustrated in FIG. 7 is suitable for switching the controllable isolating valves 63, 63', 63", 63''', 63$^{IV}$, 163 and/or the controllable vent valves 73, 73', 73", 73''', 73$^{IV}$, 173 backward and forward between the first and second control states at a clock rate of a control state change U. It is thereby possible to set an effective nominal width N$_{eff}$ of any of the isolating valves 63, 63', 63", 63''', 63$^{IV}$, 163 in series arrangement with the restrictor 62 and/or the corresponding vent valves 73, 73', 73", 73''', 73$^{IV}$, 173.

More specifically, in this regard, a voltage signal 191 in the form of PWM voltage pulses of the PWM control signal 190 is shown in FIG. 7. A current signal 192 resulting from the voltage signal 191 is likewise shown. The current signal 192 of the PWM control signal corresponds in simplified form to a current profile in a coil former of controllable isolating valves 63, 63', 63", 63''', 63$^{IV}$, 163 and/or of controllable vent valves 73, 73', 73", 73''', 73$^{IV}$, 173 when a voltage signal 191 is applied to the coil former in accordance with the PWM control signal 190.

The PWM control signal 190 has a signal region 190.1 assigned to a first control state (i) and a signal region 190.2 assigned to a second control state (ii). The signal regions 190.1, 190.2 alternate at a predetermined clock rate and, in this way, bring about a control state change U between the states. In principle, the clock rate can be set between 4 Hz and 20 Hz (e.g., FIG. 7 shows a clock rate of 10 Hz). In particular, the controllable isolating valves 63, 63', 63", 63''', 63$^{IV}$, 163 and/or the controllable vent valves 73, 73', 73", 73''', 73$^{IV}$, 173 are thus switched backward and forward at the clock rate of 10 Hz as part of the control state change U, between a first control state (i) (in signal region 190.1) assigned to the closed state and a second control state (ii) (in signal region 190.2) assigned to the open state. During the control state change U, i.e., for signal regions 190.1, 190.2, the controllable isolating valve and/or vent valve is/are in the through-flow mode. In other words, a controllable valve, in the present case, the controllable isolating valves 63, 63', 63", 63''', 63$^{IV}$, 163 and/or the controllable vent valves 73, 73', 73", 73''', 73$^{IV}$, 173, is guided toward the closed state in the first signal region 190.1, without the closed state being reached; this tendency corresponds to the first control state (i). In a corresponding manner, a controllable valve, in the present case, the controllable isolating valves 63, 63', 63", 63''', 63$^{IV}$, 163 and/or the controllable vent valves 73, 73', 73", 73''', 73$^{IV}$, 173, is guided toward the open state in the second signal region 190.2, without the open state being reached; this tendency corresponds to the second control state (ii). In a modified embodiment, it is also possible for the closed state of the controllable valve to be reached during a signal region 190.1 without departing from the concept of the present embodiment. Moreover, it is also possible for the open state of the controllable valve to be reached during a signal region 190.2 without departing from the concept of the present embodiment. As a preferred option in the present case, however, the clock rate of the control state change U, i.e., the clock rate of an alternation between the signal regions 190.1 and 190.2, is about 10 Hz. In principle, a clock rate of this kind of between 4 and 20 Hz can be chosen. Basically, this has the effect that, in the case of a higher clock rate, a controllable valve moves backward and forward between a completely closed state and a completely open state without the completely open or completely closed state necessarily being ultimately reached, although it could be reached at a lower clock rate.

More specifically, as part of the control state change U, the clocked switchover of a controllable isolating valves 63, 63', 63", 63''', 63$^{IV}$, 163 and/or of a controllable vent valves 73, 73', 73", 73''', 73$^{IV}$, 173 in the through-flow mode takes place as follows: in the first signal region 190.1, the pulse widths $t_3$ in relation to the interpulse widths $t_4$ of a voltage signal 191 in the form of PWM voltage pulses are chosen such that a current signal 192 to which they give rise is less than or equal to a reset current $I_R$. In other words, a pulse/no pulse ratio $t_3/t_4$ is chosen to be so small that a current signal 192 during the pulse time $t_3$ can rise only to a value less than or equal to the reset current $I_R$ and, during the interpulse time $t_4$, drops back again by a sufficient amount. In signal region 190.1, a controllable valve is thus not switched and remains in a control state (i) assigned to the "de-energized" and closed state. For example, this state corresponds to the de-energized and closed state of the isolating valves 63, 63', 63", 63''', 63$^{IV}$, 163 shown in FIGS. 1, 2A, 2B, and 4.

In a second signal region 190.2, a pulse/no pulse ratio $t_1/t_2$ of the voltage signal 191 in the form of the PWM voltage pulses is chosen to be greater than in the first signal region 190.1. In other words, the pulse times $t_1$ are then chosen such that a current signal 192 has sufficient time to rise to a switching current $I_S$ and, during the interpulse times $t_2$, at least does not fall below the reset current $I_R$. This has the effect that, when the switching current $I_S$ of the current signal 192 is reached or exceeded, a controllable valve is switched through (i.e., isolating valves 63, 63', 63", 63''', 63$^{IV}$, 163 are transferred from de-energized and closed states to energized and open states.

As can be seen from the characteristic of the PWM control signal 190 in FIG. 7, the time duration of a second signal region 190.2 is limited to such an extent that a completely open state is not fully reached in the associated control state (ii) of the controllable valve. On the contrary, a current signal 192 falls below the reset current $I_R$ at a time $t_R$. Before the completely open state of the controllable valve (namely, the isolating valves 63, 63', 63", 63''', 63$^{IV}$, 163) is reached, a transition back to a first signal region 190.1, in which the controllable valve can make a transition to a control state (i) assigned to the de-energized and closed state, takes place in accordance with the clock rate (e.g., as illustrated in FIG. 7) of a control state change of 10 Hz of the PWM control signal 190.

The duration of the first signal region 190.1 is once again limited in time in accordance with the clock rate shown such that a second signal region 190.2 follows before the completely closed state of the controllable valve is finally reached. This has the effect that, when the switching current $I_S$ is reached at time $t_S$, the controllable valve is transferred back to an open state.

The dynamic backward and forward guidance of the controllable valve-, i.e., of the controllable isolating valves 63, 63', 63", 63''', 63$^{IV}$, 163 and/or of the controllable vent valves 73, 73', 73", 73''', 73$^{IV}$, 173, in this way, at a predetermined clock rate of 10 Hz, between a first control state (i) assigned to the closed state and the second control state (ii) assigned to the open state has the effect that, in the through-flow mode of the controllable valve, it is possible to exercise closed-loop and/or open-loop control over the flow rate of the controllable valve by means of an effective nominal width $N_{eff}$ of the controllable valve, which can be adjusted in this way. By switching backward and forward between a closed state, the actual nominal width of the controllable valve in the completely closed state is in practice reduced to the effective nominal width $N_{eff}$ which is assumed during the control state change U, i.e., in the state of dynamic backward and forward switching. In particular, the continuous control state change U of the controllable valve between a first and a second control state (i), (ii) at a clock rate of a control state change U between a first signal region 190.1 and a second signal region 190.2 has the effect that an effective nominal width $N_{eff}$ of a series arrangement comprising the restricting means 62 and the controllable isolating valves 63, 63', 63'', 63''', 63$^{IV}$, 163 is below an actual nominal width of the restricting means 62 in the completely open state of the isolating valves 63, 63', 63'', 63''', 63$^{IV}$, 163. In this way, an effective nominal width $N_{eff}$ that can be subjected to closed-loop and/or open-loop control is achieved in practice. However, this does not exclude the possibility in the limiting case of completely closing or completely opening the series arrangement comprising the restricting means 62 and the controllable isolating valves 63, 63', 63'', 63''', 63$^{IV}$, 163.

In one embodiment, the nominal width of a main pneumatic line 60 can be in a range above 4 mm, for example. The actual nominal width of a restricting means 62 can be between 1 and 3 mm, in the present case 2.5 mm, for example. By means of a control state change U, as described above, of controllable isolating valves 63, 63', 63'', 63''', 63$^{IV}$, 163 at a predetermined clock rate, the effective nominal width $N_{eff}$ of the series arrangement comprising the restricting means 62 and the corresponding controllable isolating valves 63, 63', 63'', 63''', 63$^{IV}$, 163 can in this way be adjusted to below the actual nominal width of the restricting means of 2.5 mm. For example, the effective nominal width $N_{eff}$ of the series arrangement can be adjusted in a range between 0.6 mm and 2.5 mm, depending on the clock rate chosen, by a clocked control state change U of the controllable isolating valve.

In order, on the other hand, to transfer the controllable isolating valves 63, 63', 63'', 63''' 63$^{IV}$, 163 to a completely closed state in the regularly occurring limiting case, a voltage signal 191 can be provided for a longer period of time than the first signal region 190.1, with the result that, in that case, a current signal 192 remains below the reset current $I_R$ for a longer time. It is also possible to completely de-energize the isolating valves 63, 63', 63'', 63''', 63$^{IV}$, 163. In this case, any of the controllable isolating valves makes a transition completely into the closed state and can close the main pneumatic line 60 bidirectionally and completely. Conversely, in a third signal region 190.3 illustrated by way of example, a voltage signal 191 with a pulse/no pulse ratio $t_5/t_6$ can be chosen such that a current signal 192 can rise in accordance with the pulse rate of the PWM control signal to a holding current $I_H$. A holding current $I_H$ is sufficient to hold any of the controllable isolating valves 63, 63', 63'', 63''', 63$^{IV}$, 163 and/or the corresponding controllable vent valves 73, 73', 73'', 73''', 73$^{IV}$, 173 in energized and open states. A pulse rate of the PWM control signal itself can be chosen in a range of about 10 kHz, irrespective of the pulse/no pulse ratio $t_1:t_2$ or $t_3:t_4$ or $t_5:t_6$.

FIG. 7 shows the resulting characteristic of a PWM signal 190, in which a through-flow mode of the controllable valve is influenced by partial opening and closing of the controllable valve by clocked control state change U, i.e., alternation of the first and second signal regions 190.1 and 190.2. In this way, a flow rate can be subjected to closed-loop and/or open-loop control by means of the clock rate of the control state change U and the above-described effective nominal width $N_{eff}$ of the valve brought about thereby. In the region of the clocked control state change U between the first and second control states (i), (ii), which in the present case spans the alternating first and second signal regions 190.1 and 190.2, the series arrangement comprising the restricting means 62 and the controllable isolating valves 63, 63', 63'', 63''', 63$^{IV}$, 163 is in the through-flow mode, in which an effective nominal width $N_{eff}$ of the series arrangement comprising the restricting means 62 and the corresponding controllable isolating valves 63, 63', 63'', 63''', 63$^{IV}$, 163 is below an actual nominal width of the restricting means 62. In a further region, which is assigned to the third signal region 190.3, the series arrangement is completely open and the nominal width thereof corresponds to the static nominal width of the restricting means 62, in the present case 2.5 mm. In a region (not shown) in which a current signal 192 is below a reset current $I_R$ (similar to the first signal region 190.1), the controllable isolating valve makes a transition into a completely closed state, as illustrated in FIGS. 1, 2A, 2B, and 4, and closes the pneumatic connection comprising the main pneumatic line 60 and the pneumatic line 96 bidirectionally and completely.

In summary, therefore, in the present case, a first control state (i) is assigned to a first PWM control signal in the first signal region 190.1, and a second control state (ii) is assigned to a second PWM control signal in the second signal region 190.2. The clock rate of the control state change U can be modified in accordance with different control parameters. It is also possible to modify a duration of the first and second signal regions 190.1 and 190.2 in accordance with a very wide range of control parameters. For this purpose, the spacing between times $t_S$ and $t_R$ can be modified according to requirements in accordance with a control parameter. For example, a total opening time of a controllable valve can be set according to requirements in the through-flow mode. For this purpose, the duration of a first signal region 190.1 can be lengthened or shortened, for example, i.e., the spacing between times $t_R$ and $t_S$ can be lengthened or shortened. A switching speed can be influenced by changing the clock rate, i.e., the alternation between the first and second signal regions 190.1, 190.2. In principle, a large number of control parameters can be used to adjust the effective nominal width of the series arrangement, it being possible for the control parameters to be supplied by a vehicle controller or a state of a pneumatic installation 90 or the state of compressed air supply devices 11, 21, 30, 41, for example. Thus, for example, the switching speed of a controllable valve and/or a total opening time in the through-flow mode or a total closing time in the isolating mode can be adjusted. It is also possible for a first control state and/or second control state to be adjusted in a variable manner. In other words, a control state change of the kind described with reference to FIG. 7 does not necessarily have to take place between first and second signal regions 190.1, 190.2 that are always the same. As already indicated above, an actual switching state of a controllable valve can be adjusted by changing the first and second control states, i.e. by means of the first and second signal regions 190.1, 190.2, in particular can be continuously adjusted. The actual control state of a controllable valve can define virtually any position of an armature of the valve continuously between a completely closed and a completely open position.

These and other possibilities for adjusting a control state change U can be performed in accordance with a discharge characteristic of a pneumatic installation 90 and/or of compressed air supply devices 11, 21, 22, 23, 24, 30, 41, for example. A gallery pressure in a pneumatic installation can also serve as a control parameter. A gallery pressure can be measured by a pressure sensor 98 of the kind connected to a gallery line 95 via the sensor branch line 99.3 in FIG. 1, for example. It is also possible for a current air release situation to be the decisive factor for appropriate adjustment of the effective nominal width $N_{eff}$ of the series arrangement comprising the restricting means 62 and the controllable isolating valves 63, 63', 63", 63'", 63$^{IV}$, 163. Moreover, an actual distance between a setpoint and an actual value of an air release or air admission situation can be used as a control parameter for a control state change. If, for example, the distance between the setpoint and the actual value of a gallery pressure of the pneumatic installation is relatively large, this can be used to initiate a relatively quick venting process. For this purpose, the clock rate of a control state change can be reduced or the duration of a second signal region 190.2 can be lengthened, for example. It is likewise possible for an air drier regeneration requirement to be a decisive factor in the adjustment of the effective nominal width $N_{eff}$. On the other hand, acoustic values of compressed air supply devices 11, 21, 22, 23, 24, 30, 41 and/or of pneumatic installation 90 can be used to make a venting process relatively quiet and, in particular, to prevent an explosive release of air. For this purpose, it can be specified, in the context of a particularly preferred embodiment, that a completely open state of the controllable isolating valves 63, 63', 63", 63'", 63$^{IV}$, 163 is to be avoided for certain pressure values of the gallery pressure and that a clock rate of a control state change U, i.e., an alternation between the signal regions 190.1 and 190.2, is to take place at a minimum clock rate. Above a certain pressure level of the gallery pressure, a minimum clock rate can ensure that a pressure pulse is divided into sufficiently short pressure pulses of sufficiently low amplitude, which cannot lead to an explosive release of air.

In one preferred embodiment of a control method for a compressed air supply device, a flow rate of the controllable isolating valves 63, 63', 63", 63'", 63$^{IV}$, 163 and/or the controllable vent valves 73, 73', 73", 73'", 73$^{IV}$, 173 in the through-flow mode is subjected to closed-loop and/or open-loop control, wherein at least one of the valves is switched backward and forward between a first and a second control state at a clock rate of a control state change. Depending on a pressure value of the pneumatic installation 90, in particular a gallery pressure, the control method can envisage that, in the through-flow mode, a minimum clock rate that is dependent on the pressure value for the clock rate is provided in order to avoid an explosive release of air.

The result is that the solenoid valve arrangements 80, 80', 80", 80'", 80$^{IV}$, 180 of compressed air supply devices 11, 21, 22, 23, 24, 30, 41, which can be switched backward and forward with a clocked control state change in the through-flow mode, offer the possibility of enabling an effective nominal width $N_{eff}$ of a series arrangement comprising the restricting means 62 and the corresponding controllable isolating valves 63, 63', 63", 63'", 63$^{IV}$, 163 to be subjected to closed-loop and/or open-loop control. It is thereby possible, in the through-flow mode, not only to exercise closed-loop and/or open-loop control over a flow rate but, in addition, to avoid disadvantageous situations such as an explosive release of air. It is also possible to adjust venting, air admission or other operating states of the compressed air supply devices 11, 21, 22, 23, 24, 30, 41 in accordance with the abovementioned control parameters.

A combination of vent valves 73, 73', which are open when de-energized and corresponding isolating valves 63', which are closed when de-energized, has proven particularly advantageous as illustrated in FIGS. 1 and 2A. In this case, isolating valves 63, 63' can initially be switched on their own for a venting process and transferred to the through-flow mode for this purpose. For a combination of a vent valve 73", which is closed when de-energized, and an isolating valve 63", which is closed when de-energized, it has proven advantageous for a venting process initially to switch the vent valve before the open state and only then or simultaneously to transfer the isolating valve to a through-flow mode (described above by way of example with reference to FIG. 7).

Figure 8:
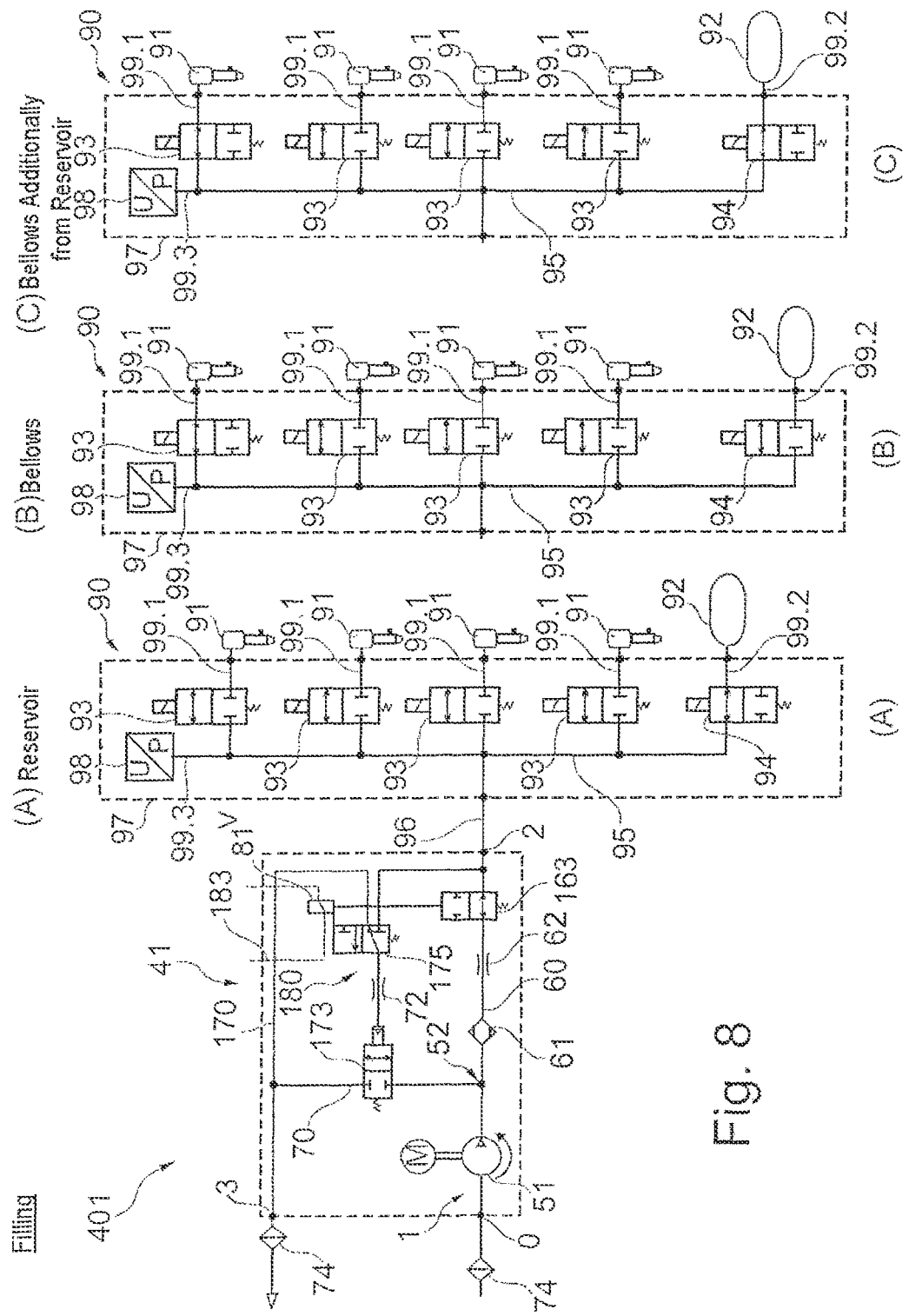
FIG. 8 are circuit diagrams of the pneumatic system of FIG. 4 in different operating states (A), (B), and (C) during filling of the pneumatic installation in accordance with an embodiment of the invention.
Figure 9:
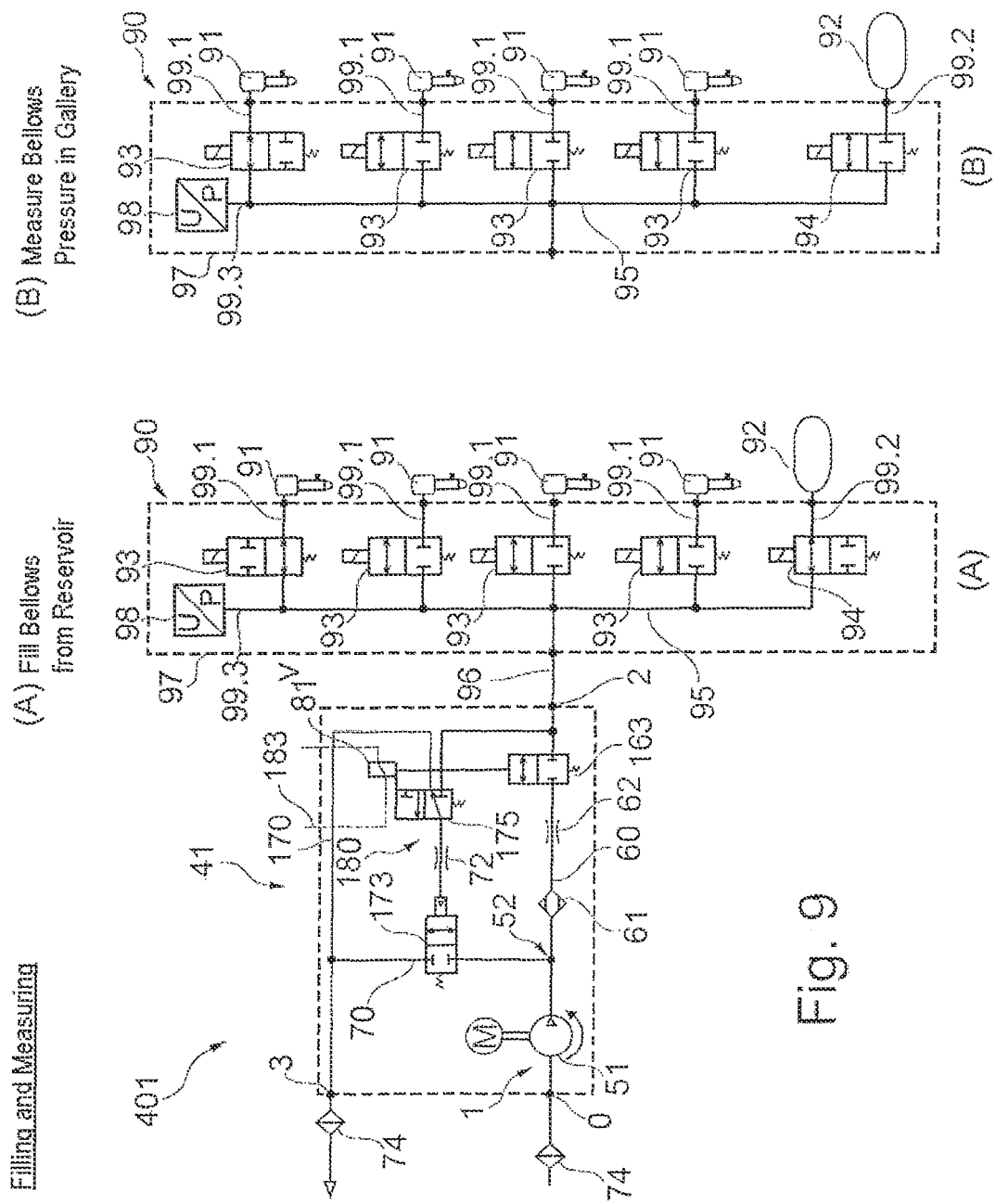
FIG. 9 are circuit diagrams of the pneumatic system of FIG. 4 in different operating states (A)-(D) during measurement within the pneumatic installation in accordance with an embodiment of the invention.
Figure 9:
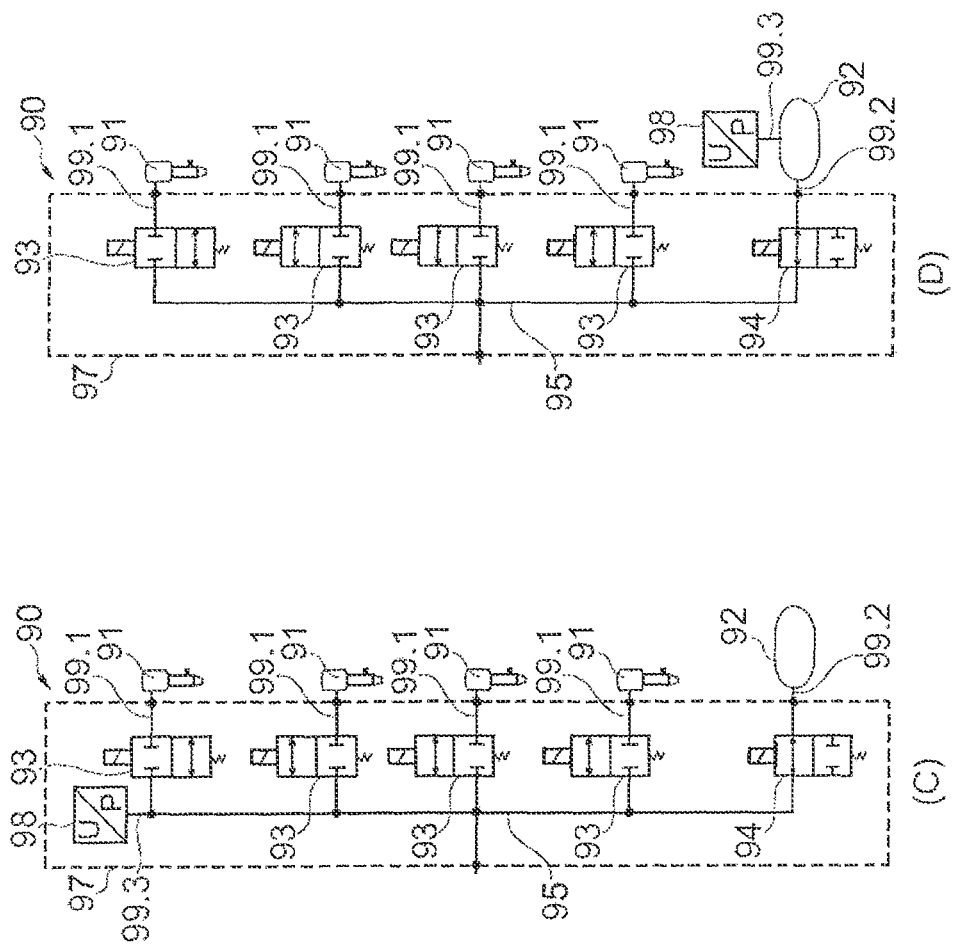
Figure 10:
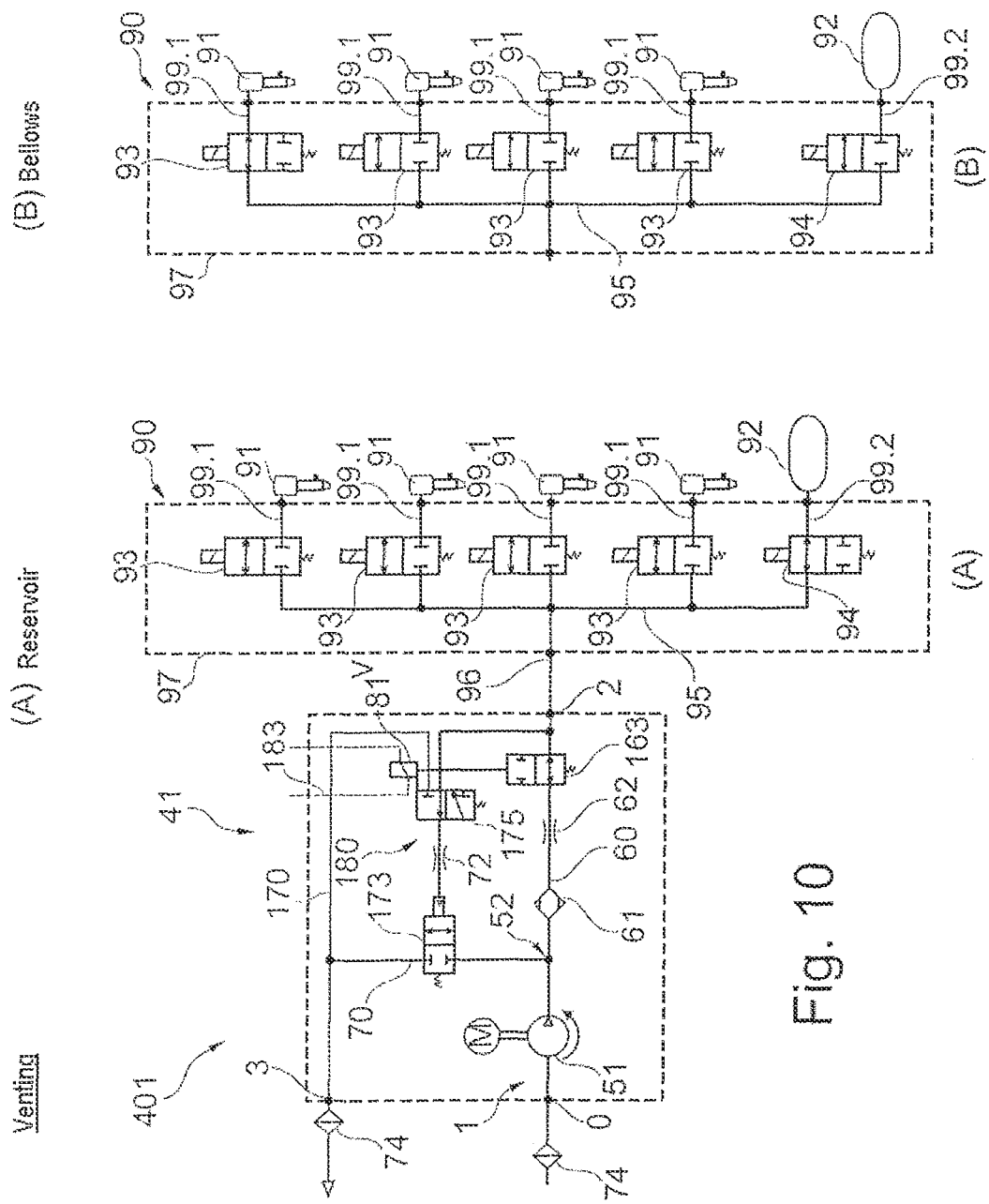
FIG. 10 are circuit diagrams of the pneumatic system of FIG. 4 in different operating states (A) and (B) during venting of the pneumatic installation in accordance with an embodiment of the invention.

FIGS. 8-10, apply to the compressed air supply device 41 and the pneumatic installation 90 (in the form of an air spring installation) of FIG. 4. As shown in FIGS. 8-10, selected functional positions of the compressed air supply device 41 and of the pneumatic installation 90 can be used for different operating positions of the pneumatic system 401.

In FIG. 8, views (A), (B), and (C) show different operating positions for filling the pneumatic installation 90. In all the operating positions, the controllable isolating valve 163, i.e., the primary valve of the solenoid valve arrangement 180, is in an energized and open position. That is, the main pneumatic line 60 and hence the compressed air supply device 41 is open to the further pneumatic line 96 and to the gallery line 95. In particular, it is advantageous if the controllable isolating valve 163 is in a completely open state during filling since, in most situations, there is no reason to reduce the effective nominal width of the series arrangement comprising the restricting means 62 and the controllable isolating valve to below the actual nominal width of the restricting means 62.

View (A) of FIG. 8 shows a functional position of the pneumatic system 401 in which the reservoir 92 of the pneumatic installation 90 is being filled. For this purpose, the reservoir solenoid valve 94 arranged ahead of the reservoir 92 is energized and hence open. Via the main pneumatic line 60, the further pneumatic line 96 and the gallery line 95, the reservoir 92 can be filled with the compressed air of the compressed air supply device 41 delivered from the compressed air feed 1. In the present case, the reservoir 92 is filled up to a reservoir pressure in a range of between 13.5 and 18 bar.

View (B) of FIG. 8 shows an operating position of the pneumatic system 401 in which the bellows 91 are being filled with compressed air. The functional position of the compressed air supply device 41 corresponds to view (A) of FIG. 8, and therefore attention is drawn here to the description of the functional position of the compressed air supply device 41 in view (A). In contrast to the operating position of the pneumatic system 401 and to filling of the reservoir 92, the upstream reservoir solenoid valve 94 ahead of the reservoir 92 is in a de-energized and closed position in the present case. On the other hand, the upstream bellows solenoid valves 93 ahead of the bellows 91 are energized and open, enabling the compressed air made available from the pressure feed 1 to be delivered via the main pneumatic line 60 and the further pneumatic line 96 into the gallery line 95 and into the bellows 91. In the present case, the bellows 91 are filled up to a bellows pressure in a range of from 5 to 12 bar.

View (C) of FIG. 8 shows an operating position of the pneumatic system 401 in which the bellows 91 of the pneumatic installation 90 are filled with compressed air both from the reservoir 92 and from the compressed air feed 1. For this purpose, both the bellows solenoid valves 93 arranged ahead of the bellows 91 and the reservoir solenoid valve 94 arranged ahead of the reservoir 92 are energized and therefore open. In the operating position of the pneumatic system 401, which is shown in view (C) of FIG. 8, the delivery pressure of the compressed air feed 1 corresponds at least to the reservoir pressure of the reservoir 92, with the result that the bellows 91 can be filled equally from the reservoir 92 and from the gallery line 95.

Views (A)-(D) of FIG. 9 show further operating positions of a pneumatic system 401 that are suitable for cross-connecting bellows 91 and for measuring operations in the pneumatic installation 90. In all cases of the operating positions of the pneumatic system 401 in views (A) to (D) of FIG. 9, the compressed air supply device 41 is in the functional position shown in view (A). In this case, the controllable isolating valve 163 serving as the primary valve of the solenoid valve arrangement 180 is in a completely closed state, i.e., is closed when de-energized. As a result, the main pneumatic line 60 is bidirectionally and completely closed for a compressed air flow to the further pneumatic line 96 and to the gallery line 95. The compressed air supply device 41 is thus decoupled from the pneumatic installation 90. This has the advantageous result that the operating positions of the pneumatic system 401 shown in views (A) to (D) of FIG. 9 can be implemented in the pneumatic installation 90 without affecting or indeed negatively affecting the compressed air supply device 41, in particular the air drier thereof.

The operating position of the pneumatic system 401 shown in view (A) of FIG. 9 is used to fill the bellows 91 of the pneumatic installation 90 from the reservoir 92 thereof. For this purpose, all the bellows solenoid valves 93 and the reservoir solenoid valve 94 arranged ahead of the reservoir and the bellows 91 are energized, i.e., are in open states. Compressed air stored in the reservoir 92 at a reservoir pressure of about 13.5 to 18 bar can thus flow from the higher compressed air level into the bellows 91 via the gallery line 95, enabling a bellows pressure in a range of from 5 to 12 bar to be achieved.

The operating position of the pneumatic system 401, which is shown in view (B) of FIG. 9, is obtained with the same functional position of the compressed air supply device 41 as that shown in view (A) of FIG. 9. The operating position shown in view (B) of FIG. 9 is used to measure a bellows pressure, in this case in a topmost bellows 91, by means of a pressure sensor 98 connected to the gallery line 95 by a sensor branch line 99.3. Accordingly, a reservoir solenoid valve 94 arranged ahead of the reservoir 92 is in a de-energized and closed state, while a bellows solenoid valve 93, in this case the topmost valve, arranged ahead of the bellows 91 to be measured is energized and thus in an open state. When all the bellows solenoid valves 93 are open, it is also possible, in contrast to the above-mentioned individual measurement, for the bellows pressure of all the bellows 91 to be measured simultaneously. The bellows pressure of all the bellows 91 can thus be equalized via the open bellows solenoid valves 93, and the pressure averaged in this way can be measured by means of the pressure sensor 98.

As with all the further operating positions described, the operating position of the pneumatic system 401 shown in view (C) of FIG. 9 once again uses a functional position of the compressed air supply device 401 as in view (A) of FIG. 9. The operating position of the pneumatic system 401 of view (C) of FIG. 9 is used to measure the reservoir pressure by means of the pressure sensor 98 in the sensor branch line 99.3 and the gallery line 95. Accordingly, the bellows solenoid valves 93 arranged ahead of the bellows 91 are in a de-energized and closed state, while the reservoir solenoid valve 94 arranged ahead of the reservoir 92 is in an open and energized state.

The operating position of a pneumatic system 401 shown in view (D) of FIG. 9 provides a slight modification of the pneumatic installation 90. In the present case, a pressure sensor 98 is not connected to the gallery line 95 by a sensor branch line 99.3, in contrast to views (A) to (C) and (E). On the contrary, in view (D) of FIG. 9 a pressure sensor 98 is connected directly to the reservoir 92. It is thus possible to measure a reservoir pressure in the reservoir 92 directly, both when the reservoir solenoid valve 94 is open and when the reservoir solenoid valve 94 is closed.

FIG. 10 shows two views (A) and (B) of two further operating positions of a pneumatic system 401, which are used for a venting process. In this case, both the controllable isolating valve 163 of the compressed air supply device 41 and the vent valve 173 are in the through-flow mode. In the present case, the compressed air supply device 41 is in a functional position in which the control valve 175 of the solenoid valve arrangement 180 (serving as a secondary valve) and the vent valve 173 of the solenoid valve arrangement 180 (being formed as a relay valve) are in open states. In particular, the relay valve is in a completely open state for this purpose, with the result that it is available with a maximum nominal width for a relatively quick venting process. On the other hand, the controllable isolating valve 163 of the solenoid valve arrangement 180 (serving as a primary valve) is in a through-flow mode, in which a flow rate of a compressed air flow can be subjected to closed-loop and/or open-loop control. In the present case, this is achieved by a clocked control state change of the controllable isolating valve 163 as described with reference to FIG. 7. That is, the open position of the controllable isolating valve 163, which is shown in view (A) of FIG. 10, is chosen such that, on the one hand, relatively quick venting can take place and, on the other hand, that acoustic phenomena associated with the compressed air supply device 41 are kept to a relatively low level. In particular, a clock rate of a control state change is set between a first and a second control state, as described above with reference to FIG. 7. A minimum clock rate is chosen such that a pressure pulse from the gallery line 95 and/or from the further pneumatic line 96 is reduced to such an extent that an explosive release of air is reliably avoided.

The latter applies particularly to the operating position of the pneumatic system 401, which is shown in view (A) of FIG. 10, the system being used to vent the pneumatic installation 90 and the compressed air supply device 41 from the reservoir 92. Since the reservoir pressure is relatively high, being in a range of between 13.5 and 18 bar, this operating position of the pneumatic system 401 tends to trigger an explosive release of air. In the present case, this is avoided, in particular, by the fact that a clocked control state change with a sufficiently high clock rate (i.e., in accordance with FIG. 7) for the controllable isolating valve 163 is chosen at least for a first phase of the venting process, with the vent valve 173 and the reservoir solenoid valve 94 arranged ahead of the reservoir 92 being in a completely open state. The bellows solenoid valves 93 arranged ahead of the bellows 91 are in a de-energized and closed state.

In a second phase of the venting process, e.g., when the pressure in the reservoir 92 has fallen to a sufficiently low level, the controllable isolating valve 163 can be transferred to a completely open state, as shown, for example, by signal region 190.3 in FIG. 7. In signal region 190.3, the current signal at least reaches a holding current which is sufficient to hold the controllable isolating valve 163 in a completely open position. Any residual pressure remaining in the reservoir 92 can thus be vented via the series arrangement of the restricting means 62 and the controllable isolating valve 163 with a maximum nominal width of the restricting means 62.

View (B) of FIG. 10 shows the pneumatic system 401 in an operating position, which is used to vent the bellows 91 of the pneumatic installation 90 in the form of an air spring installation. For this purpose, the bellows are opened individually or in groups, according to requirements, although simultaneous opening of all the bellows 91 is avoided. Since the bellows pressure is relatively low in comparison with a reservoir pressure of 13.5 to 18 bar, being in a range of between 5 and 12 bar, there is a reduced risk of an explosive release of air. It is thus fundamentally possible, depending on the design of the pneumatic system 401, for the controllable isolating valve 163 to be moved into a completely open state for the venting process and to remain there. This can be accomplished, for example, by continuous application to the controllable isolating valve 163 of a control signal corresponding to signal regions 190.2 and 190.3 of the PWM control signal 190 in FIG. 7. For example, the controllable isolating valve 163 can be switched to an open state by applying a control signal of signal region 190.2 of the PWM control signal 190, i.e., a control current 192 reaches the switching current $I_S$ and then falls to a holding current $I_H$, with the result that the controllable isolating valve 163 is switched to a completely open state and remains there. As an alternative, it is also possible to choose a procedure similar to that described with reference to view (A) of FIG. 10. However, a lower clock rate of a control state change can be chosen for a first phase of a venting process, i.e., for an initial high pressure peak when the bellows 91 are vented, as compared with a relatively high clock rate of a control state change when the reservoir 92 is vented.

Figure 11:
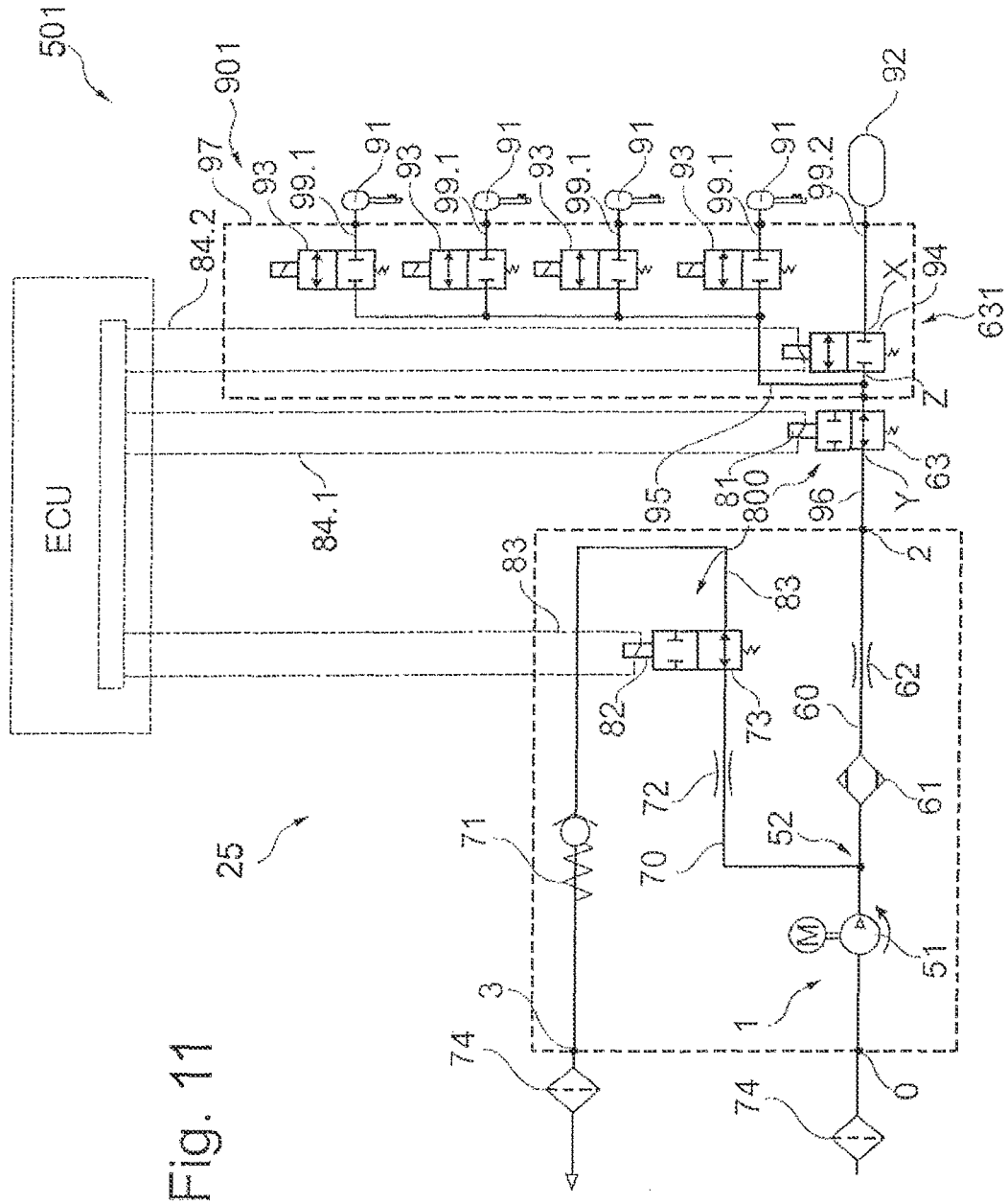
FIG. 11 is a circuit diagram of a pneumatic system having a modified version of the compressed air supply device of FIG. 1, where the isolating and vent valves are formed separately, but are controlled by a common control signal.
Figure 12:
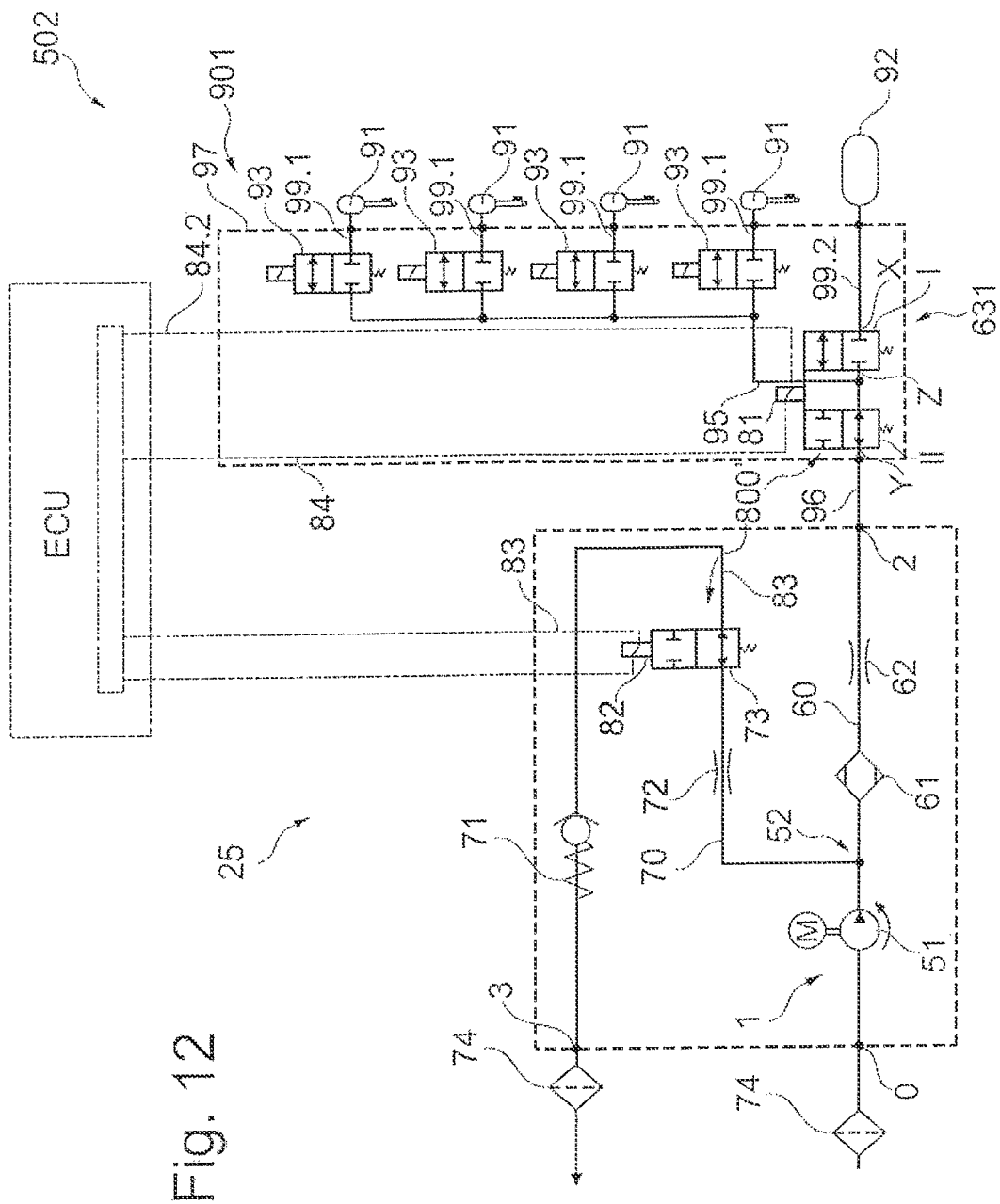
FIG. 12 is a circuit diagram of a pneumatic system similar to the pneumatic system of FIG. 11, but where two isolating valves are arranged in a common coil former and formed separately into a vent valve, and where the isolating valves and the vent valve are controlled by a common control signal common in accordance with an embodiment of the invention.

FIGS. 11 and 12 show an expansion of the solenoid valve arrangement 80 of FIG. 1 that includes solenoid valve arrangements 800, 800', and which has a vent valve 73 and an isolating valve arrangement 631 and 632, respectively. All of these, or at least the controllable isolating valve 81 and the controllable vent valve 73, are set up to be controlled by means of a control signal 190 that is common to all of them. The common control signal is supplied by the same ECU in each case.

More specifically, FIG. 11a pneumatic system 501 with a compressed air supply device 25 and a pneumatic installation 901, without a pressure sensor 98 according to one embodiment. A pressure sensor 98 can be fitted for the pneumatic installation 901, as in the pneumatic installations 90 of FIG. 9, for example, either on the gallery line 95 or on the compressed air reservoir 92. For the compressed air supply device 25, attention is drawn in principle to the description of FIG. 1. In one embodiment, an isolating valve arrangement 631 is formed by the isolating valve 63 and a reservoir solenoid valve 94 arranged ahead of the reservoir 92. In another embodiment of the invention, the isolating valve arrangement 631 is formed with three ports X, Y, Z by means of a first directional control valve, in the form of a 2/2-way valve (also referred to below as a primary valve) and of a second directional control valve in the form of a 2/2-way valve (also referred to below as a secondary valve). The first directional control valve is formed by the isolating valve 63 and the second directional control valve is formed by the reservoir solenoid valve 94. The reservoir 92 is connected via the reservoir branch line 99.2 to port X formed on the first directional control valve. The compressed air port 2 of the compressed air supply device 25 is connected to port Y, formed on the second directional control valve, via the further pneumatic line 96. The gallery line 95 of the pneumatic installation 901 is connected to the third port Z formed between the first and the second directional control valve. It is thus possible to switch the compressed air port 2, the compressed air reservoir 92, and the gallery line 95 by means of a single isolating valve arrangement 631 using the isolating valve arrangement 631 formed by means of the two directional control valves, i.e., the isolating valve 63 and the reservoir solenoid valve 94, and having three ports X, Y, Z. The embodiment of a PWM control signal 190 which has been described with respect to clocking of an isolating valve 163 can also be implemented unmodified for the isolating valve 63 and/or reservoir solenoid valve 94 in the context of isolating valve arrangement 631.

In the present case, the vent valve 73, the isolating valve 63, and the reservoir solenoid valve 94 are formed as separate 2/2-way valves. Once again, the reservoir solenoid valve 94 is implemented as part of a valve block 97 having five valves, i.e., as a sequence of five 2/2-way valves, together with the gallery line 95. The second directional control valve in the form of the isolating valve 63 is arranged in the further pneumatic line 96 leading to the compressed air port 2. In the embodiment shown here, the second directional control valve in the form of the isolating valve 63 is to be assigned to the compressed air supply device 25. However, it is not necessary in the present case for the isolating valve 63 to be arranged in the main pneumatic line 60 between compressed air feed port 52 and compressed air port 2, as is the case in the compressed air supply device 11 of FIG. 1. In principle, therefore, compressed air supply device 25 can be implemented without the isolating valve 63, and hence, the isolating valve 63 is formed separately from compressed air supply device 25 and separately from the valve block 97.

Moreover, in contrast to the compressed air supply device 11 of FIG. 1, separate control lines 83, 84.1 and 84.2 are provided for each of the directional control valves in the compressed air supply device 25 of FIG. 11 (i.e., for the vent valve 73, the isolating valve 63, and the reservoir solenoid valve 94 ahead of the reservoir 92). The directional control valves can therefore be controlled separately, although by means of a vehicle controller common to all of them or a control module assigned to the vehicle controller ECU.

FIG. 12 shows a pneumatic system 502 that is of substantially similar construction to pneumatic system 501, in particular, having the same compressed air supply device 25. In contrast to pneumatic system 501, however, pneumatic system 502 includes a modified pneumatic installation 902, in which the isolating valve arrangement 632 is formed by a unit comprising two 2/2-way valves, namely a primary valve I and a secondary valve II. The primary valve I and the secondary valve II can advantageously be implemented as part of a double armature solenoid valve, which is connected to the ECU by a single control line 84. In contrast to the embodiments in FIGS. 2A and 2B, in which isolating valves 63', 63" are each formed as a modular unit with a corresponding one of vent valves 73', 73" to give a double armature solenoid valve with common control lines 83', 83", a separate vent valve 73 is provided in the compressed air supply device 25, in the present case. Moreover, previously provided isolating valves 63', 63" (here acting as secondary valve II) together with a previously provided reservoir solenoid valve 94 (here acting as primary valve I) is provided as part of a modular unit of a double armature solenoid valve of the isolating valve arrangement 632. In the present case, it is particularly advantageous to implement the isolating valve arrangement 632 as part of the valve block 97, together with the gallery line 95. Once again, the double armature solenoid valve of the isolating valve arrangement 632, according to the embodiment of the invention that has three ports X, Y, Z, also allows joint switching of the compressed air port 2, the compressed air reservoir 22, and the gallery line 95 by means of the single isolating valve arrangement 632.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply device for operating a pneumatic installation, comprising:
   a compressed air feed;
   a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
   a vent line pneumatically coupled to the main pneumatic line and a vent port that leads externally to the device, the vent line comprising at least one controllable vent valve, the at least one controllable vent valve and the at least one controllable isolating valve being controllable via a common control signal.

2. The compressed air supply device as claimed in claim 1, wherein the main pneumatic line extends to a compressed air port that leads to the pneumatic installation.

3. The compressed air supply device as claimed in claim 1, Wherein the at least one controllable vent valve is part of a solenoid valve arrangement, and configured to directly switch a compressed air volume.

4. A pneumatic system comprising the compressed air supply device as claimed in claim 1.

5. The compressed air supply device of claim 1, wherein the pneumatic installation is an air spring installation.

6. A compressed air supply device for operating a pneumatic installation, comprising:
   a compressed air feed;
   a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
   a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein the at least one controllable isolating valve is formed with a first coil, wherein the at least one controllable vent valve is formed with a second coil, and wherein the first and second coils are formed with a single common coil former.

7. A compressed air supply device for operating a pneumatic installation, comprising:
   a compressed air feed;
   a main pneumatic line disposed between the compressed air feed and the pneumatic installation, the main pneumatic line comprising an air drier, restricting device, and at least one controllable isolating valve, the restricting device and the at least one controllable isolating valve being disposed in series in the main pneumatic line; and
   a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein, in a through-flow mode, at least one of the at least one controllable isolating valve and the at least one vent valve is switchable via the common control signal from a closed state to an open state.

8. The compressed air supply device as claimed in claim 7, wherein a through-flow quantity for the at least one of the at least one controllable isolating valve and the at least one controllable vent valve is subjectable to at least one of closed-loop and open-loop control via the common control signal when in the through-flow mode.

9. The compressed air supply device as claimed in claim 7, wherein, in the through-flow mode, the at least one of the at least one controllable isolating valve and the at least one vent valve is switchable between the closed and open states at a clock rate of a control state change.

10. The compressed air supply device as claimed in claim 9, wherein the clock rate is between 4 Hz and 20 Hz.

11. A compressed air supply device for operating a pneumatic installation, comprising:
    a compressed air feed;
    a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
    a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein at least one of the at least one isolating valve and the at least one vent valve is variably adjustable via the common control signal between closed and open states.

12. A compressed air supply device for operating a pneumatic installation, comprising:
    a compressed air feed;
    a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
    a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein the common control signal is one of a current PWM control signal and a voltage PWM control signal.

13. A compressed air supply device for operating a pneumatic installation, comprising:
    a compressed air feed;
    a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein the restricting device and the at least one controllable isolating valve are disposed in a series arrangement, and wherein, in a through-flow mode, the at least one controllable isolating valve is switchable via the common control signal between a first and a second control state such that an effective nominal width of the series arrangement is below an actual nominal width of the restricting device.

14. A compressed air supply device for operating a pneumatic installation, comprising:
a compressed air feed;
a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein the at least one controllable vent valve is part of a solenoid valve arrangement, and configured to indirectly switch a compressed air volume, wherein the solenoid valve arrangement has a control valve configured to control a relay valve, the control valve being subjected to a total pressure of the main pneumatic line.

15. A method for operating a pneumatic installation using a compressed air supply device, the device comprising a compressed air feed; a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and a vent line pneumatically coupled to the main pneumatic line and a vent port that leads externally to the device, the vent line comprising at least one controllable vent valve, the at least one controllable vent valve and the at least one controllable isolating valve being controllable via a common control signal, the method comprising: controlling the at least one controllable isolating valve and the at least one controllable vent valve using the common control signal, and, in an isolating mode, switching the at least one controllable isolating valve to a closed state such that the main pneumatic line is bidirectionally closed.

16. The method as claimed in claim 15, wherein controlling the at least one controllable isolating valve and the at least one controllable vent valve comprises switching at least one of the at least one controllable isolating valve and the at least one controllable vent valve between the closed state and an open state at a clock rate of a control state change.

17. The method as claimed in claim 16, wherein the common control signal comprises one of a current PWM control signal and a voltage PWM control signal, and wherein the clock rate is between 4 Hz and 20 Hz.

18. The method as claimed in claim 15, wherein the at least one controllable isolating valve is closed when de-energized.

19. The method as claimed in claim 15, wherein the at least one controllable isolating valve and the at least one controllable vent valve are in closed states when de-energized, the method further comprising switching the at least one controllable vent valve from the isolating mode to a through-flow mode by switching the at least one controllable isolating valve to an open state.

20. A compressed air supply device for operating a pneumatic installation, comprising:
a compressed air feed;
a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line; and
a vent line pneumatically coupled to the main pneumatic line and a vent port that leads externally to the device, the vent line comprising at least one controllable vent valve, the at least one controllable vent valve and the at least one controllable isolating valve being controllable via a common control signal, wherein, in an isolating mode, the at least one controllable isolating valve is switchable to a closed state such that the main pneumatic line is bidirectionally closed.

21. A compressed air supply device for operating pneumatic installation, comprising:
a compressed air feed;
a main pneumatic line disposed between the compressed air feed and the pneumatic installation, the main pneumatic line comprising an air drier, a restricting device, and at least one controllable isolating valve, the restricting device and the at least one controllable isolating valve being disposed in series in the main pneumatic line;
a vent line pneumatically coupled to the main pneumatic line and a vent port that leads externally to the device, the vent line comprising at least one controllable vent valve, the at least one controllable vent valve and the at least one controllable isolating valve being controllable via a common control signal; and
a reservoir solenoid valve formed with a first coil, wherein the at least one controllable isolating valve is formed with a second coil, and wherein the first coil and the second coil are formed with a single common coil former.

* * * * *